(12) United States Patent
Nakagawa et al.

(10) Patent No.: US 11,235,645 B2
(45) Date of Patent: Feb. 1, 2022

(54) STIFFENING STRUCTURE AND STIFFENING METHOD FOR AUTOMOTIVE DOOR PANEL PART

(71) Applicant: JFE STEEL CORPORATION, Tokyo (JP)

(72) Inventors: Koichi Nakagawa, Tokyo (JP); Takanobu Saito, Tokyo (JP); Kazuhiko Higai, Tokyo (JP); Yoshikiyo Tamai, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 63 days.

(21) Appl. No.: 16/754,660

(22) PCT Filed: Sep. 13, 2018

(86) PCT No.: PCT/JP2018/033969
§ 371 (c)(1),
(2) Date: Apr. 8, 2020

(87) PCT Pub. No.: WO2019/087582
PCT Pub. Date: May 9, 2019

(65) Prior Publication Data
US 2021/0206244 A1      Jul. 8, 2021

(30) Foreign Application Priority Data

Nov. 1, 2017  (JP) .............. JP2017-211521
Mar. 8, 2018  (JP) .............. JP2018-041803

(51) Int. Cl.
*B60J 5/04*      (2006.01)
*B32B 15/08*     (2006.01)

(52) U.S. Cl.
CPC ............. *B60J 5/0443* (2013.01); *B32B 15/08* (2013.01); *B60J 5/0413* (2013.01);
(Continued)

(58) Field of Classification Search
CPC ...... B60J 5/0422; B60J 5/0423; B60J 5/0425; B60J 5/043; B60J 5/0441; B60J 5/0443
See application file for complete search history.

(56) References Cited

U.S. PATENT DOCUMENTS 4,378,394 A    3/1983  Miura et al.
4,378,395 A    3/1983  Asoshina et al.
(Continued)

FOREIGN PATENT DOCUMENTS

JP    S56-128273 A    10/1981
JP    S57-151361 A     9/1982
(Continued)

OTHER PUBLICATIONS

Nov. 6, 2020 Extended Search Report issue din European Patent Application No. 18872205.2.
(Continued)

*Primary Examiner* — Joseph D. Pape
(74) *Attorney, Agent, or Firm* — Oliff PLC

(57) ABSTRACT

A stiffening structure for an automotive door panel part according to the present invention includes a door outer panel 3 made of a metal sheet curved along a height direction, and in which a character line 3a is formed; and an impact beam 5 disposed at an inner surface side of the door outer panel 3. The stiffening structure improves tensile rigidity of the door outer panel 3 by attaching a stiffening member 7 made of resin to the inner surface of the door outer panel 3. The stiffening member 7 includes vertical bone portions 9 extending in a streak shape from the impact beam 5 to the character line 3a along a curve of the door outer panel 3. The vertical bone portions 9 are arranged at a predetermined interval in a front-rear direction of the door outer panel 3, and outer surface of the vertical bone portions 9 is bonded to the inner surface of the door outer panel 3.

12 Claims, 8 Drawing Sheets

(52) U.S. Cl.
CPC ........... *B32B 2307/51* (2013.01); *B60J 5/048* (2013.01); *B60J 5/0415* (2013.01); *B60J 5/0455* (2013.01)

(56) References Cited

U.S. PATENT DOCUMENTS

| | | | | |
|---|---|---|---|---|
| 5,325,632 | A | * | 7/1994 | Djavairian ............. B60J 5/0425 296/146.6 |
| 7,077,438 | B2 | * | 7/2006 | Albers .................. B60J 5/0447 293/102 |
| 2011/0210575 | A1 | | 9/2011 | Ishitobi et al. |
| 2011/0274897 | A1 | | 11/2011 | Dauner et al. |

FOREIGN PATENT DOCUMENTS

| | | | |
|---|---|---|---|
| JP | 2004-359114 | A | 12/2004 |
| JP | 2012-515667 | A | 7/2012 |
| JP | 2013-025533 | A | 2/2013 |
| JP | 2016-007927 | A | 1/2016 |
| KR | 1998 0036928 | U | 9/1998 |
| KR | 10-0189027 | B1 | 6/1999 |

OTHER PUBLICATIONS

Oct. 30, 2018 International Search Report issued in International Patent Application No. PCT/JP2018/033969.
Apr. 22, 2021 Office Action issued in European Patent Application No. 18 872 205.2.
Aug. 24, 2021 Office Action issued in Korean Patent Application No. 10-2020-7011483.

* cited by examiner (a)  (b)

STIFFENING STRUCTURE AND STIFFENING METHOD FOR AUTOMOTIVE DOOR PANEL PART

FIELD

The present invention relates to a stiffening structure and a stiffening method for an automotive door panel part that improve tensile rigidity of a door panel part made of a metal sheet for an automobile.

BACKGROUND

One of important functions of an automotive outer panel part such as a door, a roof, and a hood of an automobile is to secure tensile rigidity. For example, to improve the tensile rigidity of an automotive outer panel part, Patent Literature 1 discloses a technology with which a fiber-reinforced plastic (FRP) sheet adheres to the inside of a metal sheet such as a door and a fender, using a photosensitive adhesive. Further, Patent Literature 2 discloses a technology with which a carbon fiber-reinforced plastic (CFRP) adheres to a surface of a metal sheet such as a door and a roof.

CITATION LIST

Patent Literature

Patent Literature 1: Japanese Patent Application Laid-open No. S56-128273
Patent Literature 2: Japanese Laid-open Patent Publication (Translation of PCT Application) No. 2012-515667

SUMMARY

Technical Problem

The technology disclosed in Patent Literature 1 is aimed at a part arranged on a side of an automobile such as a door and a fender. Thus, the technology disclosed in Patent Literature 1 can be advantageous for concentrated load such as a dent (dent resistance) that is formed on the side of an automobile, when an edge of an object comes into contact with the side of the automobile, by adhering an FRP to the location where the load is concentrated. However, when a palm is pressed against an outer panel during waxing and the like, and a distributed load such as tensile rigidity is generated causing a large area to sag downward, the technology disclosed in Patent Literature 1 needs to adhere the FRP to the location where the load is applied. Thus, the FRP needs to be adhered over the entire inner surface of the metal sheet. Because the FRP, which is several times to several tens of times more expensive than the metal sheet, needs to be adhered over the entire large area, the cost is significantly increased.

In the technology disclosed in Patent Literature 2, because the exterior of an automobile needs to be taken into consideration, it is necessary to adhere a CFRP over the entire surface of the parts placed at the front side exposed to public view. Consequently, the cost is increased. There is a method of reducing the thickness of the CFRP layer as much as possible to reduce cost, but when such a method is applied to the present invention, it is not possible to improve the tensile rigidity of a door panel part, which is an object of the present invention.

In this manner, although there are many technologies for adhering an FRP or a CFRP to the automotive panel part, a technology for improving the tensile rigidity when a distributed load is applied, and also achieving weight reduction of an automotive body has not yet been developed.

The present invention has been made in view of the above problems, and an object of the present invention is to provide a stiffening structure and a stiffening method of an automotive door panel part that can improve the tensile rigidity of the door panel part while reducing the weight of a door panel part of an automobile.

Solution to Problem

To solve the problem and achieve the object, a stiffening structure of an automotive door panel part according to the present invention includes: a door panel part made of a metal sheet that is curved along a height direction, and in which a character line is formed; and an impact beam provided at a side of an inner surface of the door panel part, the stiffening structure of the automotive door panel part improves tensile rigidity of the door panel part by attaching a stiffening member made of resin to the inner surface of the door panel part, wherein the stiffening member includes vertical bone portions configured to extend, in a streak shape, from the impact beam to the character line along the curve of the door panel part, and the vertical bone portions are provided at a predetermined interval in a front-rear direction of the door panel part, and are bonded to the inner surface of the door panel part.

Moreover, a stiffening structure of an automotive door panel part according to the present invention includes: a door panel part that is curved along a height direction and in which a character line is formed; and an impact beam provided at a side of an inner surface of the door panel part, the stiffening structure of the automotive door panel part improves tensile rigidity of the door panel part by attaching a stiffening member made of resin to the inner surface of the door panel part, wherein the door panel part includes a door outer panel and a door inner panel, and a material of the door outer panel and the door inner panel is a combination of one of metal and metal, resin and resin, metal and resin, and resin and metal, the stiffening member includes vertical bone portions configured to extend, in a streak shape, from the impact beam to the character line along the curve of the door panel part, and the vertical bone portions are provided at a predetermined interval in a front-rear direction of the door panel part, and are bonded to the inner surface of the door panel part.

Moreover, in the stiffening structure of the automotive door panel according to the present invention, the stiffening member further includes a horizontal bone portion configured to extend in a direction intersecting with the vertical bone portions.

Moreover, in the stiffening structure of the automotive door panel according to the present invention, the stiffening member is a fiber-reinforced plastic having elastic modulus of 10 GPa or more.

Moreover, a method of stiffening an automotive door panel part that improves tensile rigidity of the automotive door panel part by attaching a stiffening member made of resin to an inner surface of a door panel part made of a metal sheet that is curved in a height direction, the door panel part having an impact beam provided on a side of the inner surface thereon according to the present invention includes: an optimally shaped stiffening member acquisition step of acquiring a door panel part model by modelling the door panel part using a two-dimensional element and/or a three-dimensional element, connecting a stiffening member model being a target of optimization analysis to the door panel part model, and performing optimization analysis for obtaining an optimal shape of the stiffening member model; a stiffening member manufacturing step of manufacturing a stiffening member that bonds to the inner surface of the door panel part, based on the optimal shape of the stiffening member model; and a stiffening member bonding step of bonding the manufactured stiffening member to the inner surface of the door panel part, wherein the stiffening member manufactured at the stiffening member manufacturing step includes vertical bone portions that extend, in a streak shape, from the impact beam to a character line formed on the door panel part made of the metal sheet along the curve of the door panel part in the height direction, and that are provided at a predetermined interval in a front-rear direction of the door panel part.

Moreover, a method of stiffening an automotive door panel part that improves tensile rigidity of the automotive door panel part by attaching a stiffening member made of resin to an inner surface of a door panel part that is curved in a height direction, the door panel part having an impact beam provided on a side of the inner surface thereon, and the door panel part including a door outer panel and a door inner panel, where a material of the door outer panel and the door inner panel is a combination of one of metal and metal, resin and resin, metal and resin, and resin and metal, according to the present invention is a method including: an optimally shaped stiffening member acquisition step of acquiring a door panel part model by modelling the door panel part using a two-dimensional element and/or a three-dimensional element, connecting a stiffening member model being a target of optimization analysis to the door panel part model, and performing optimization analysis for obtaining an optimal shape of the stiffening member model; a stiffening member manufacturing step of manufacturing a stiffening member that bonds to the inner surface of the door panel part, based on the optimal shape of the stiffening member model; and a stiffening member bonding step of bonding the manufactured stiffening member to the inner surface of the door panel part, wherein the stiffening member manufactured at the stiffening member manufacturing step includes vertical bone portions that extend, in a streak shape, from the impact beam to a character line formed on the door panel part along the curve of the door panel part in the height direction, and that are provided at a predetermined interval in a front-rear direction of the door panel part.

Moreover, in the method of stiffening the automotive door panel part according to the present invention, the stiffening member manufactured at the stiffening member manufacturing step further includes a horizontal bone portion that extends in a direction intersecting with the vertical bone portions.

Advantageous Effects of Invention

The present invention includes a door panel part made of a metal sheet that is curved along a height direction and in which a character line is formed, and an impact beam disposed on the inner surface side of the door panel part. The present invention improves tensile rigidity of the door panel part by attaching a stiffening member made of resin to the inner surface of the door panel part. The stiffening member includes a plurality of vertical bone portions that extend in a streak shape from the impact beam to the character line along the curve of the door panel part. The vertical bone portions are arranged at a predetermined interval in a front-rear direction of the door panel part, and the outer surface of the vertical bone portions are bonded to the inner surface of the door panel part. Consequently, it is possible to reduce the amount of deformation that occurs when a distributed load is applied to the door panel part, and improve the tensile rigidity of the door panel part. Moreover, the present invention can improve tensile rigidity and reduce the weight of the door panel part.

DESCRIPTION OF EMBODIMENTS

Stiffening Structure of Automotive Door Panel Part

Figure 1:
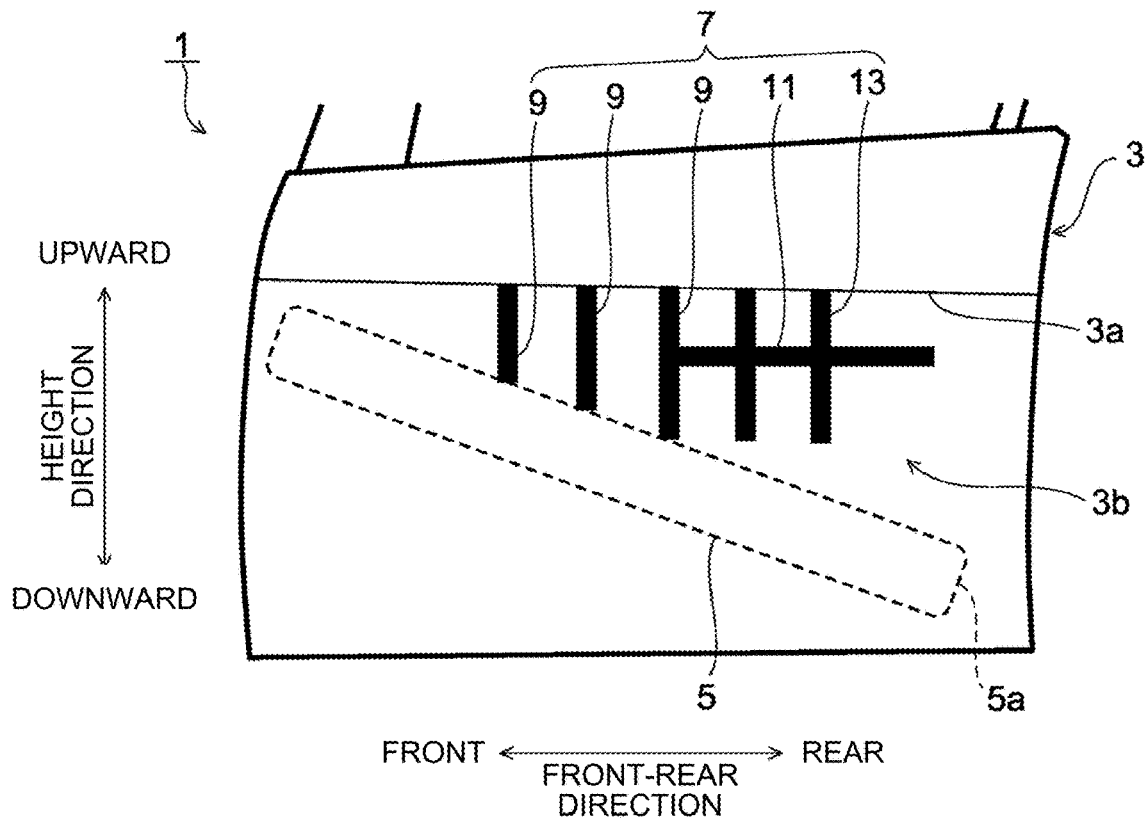
FIG. 1 is a diagram for explaining a stiffening structure for an automotive door panel part according to an embodiment of the present invention.

As illustrated in FIG. 1, a stiffening structure 1 for an automotive door panel part according to an example of an embodiment of the present invention includes a door outer panel 3 and an impact beam 5. The door outer panel 3 is curved along the height direction, and formed with a character line 3a that extends in the front-rear direction. The impact beam 5 is disposed on the inner surface side of the door outer panel 3. The stiffening structure 1 is obtained by attaching a stiffening member 7 made of resin that includes a plurality of vertical bone portions 9 and a horizontal bone portion 11 intersecting with the vertical bone portions 9 to the inner surface of the door outer panel 3. FIG. 1 is a side view of the door outer panel 3 viewed from the exterior side of an automobile in the width direction, and the impact beam 5 disposed in the interior is illustrated in dotted lines (hereinafter, the same applies for FIG. 3 to FIG. 5, and FIG. 7 to FIG. 9). Moreover, the stiffening member 7 made of resin is disposed in the interior.

The vertical bone portions 9 extend in a streak shape from the impact beam 5 to the character line 3a along the curve of the door outer panel 3 in the height direction. The vertical bone portions 9 are arranged at a predetermined interval in the front-rear direction of the door outer panel 3, and the outer surface of each of the vertical bone portions 9 is bonded to the inner surface of the door outer panel 3. The horizontal bone portion 11 is provided so as to extend in the direction intersecting with the vertical bone portions 9, and is provided around the center portion of a panel surface part 3b in the height direction.

Figure 2:
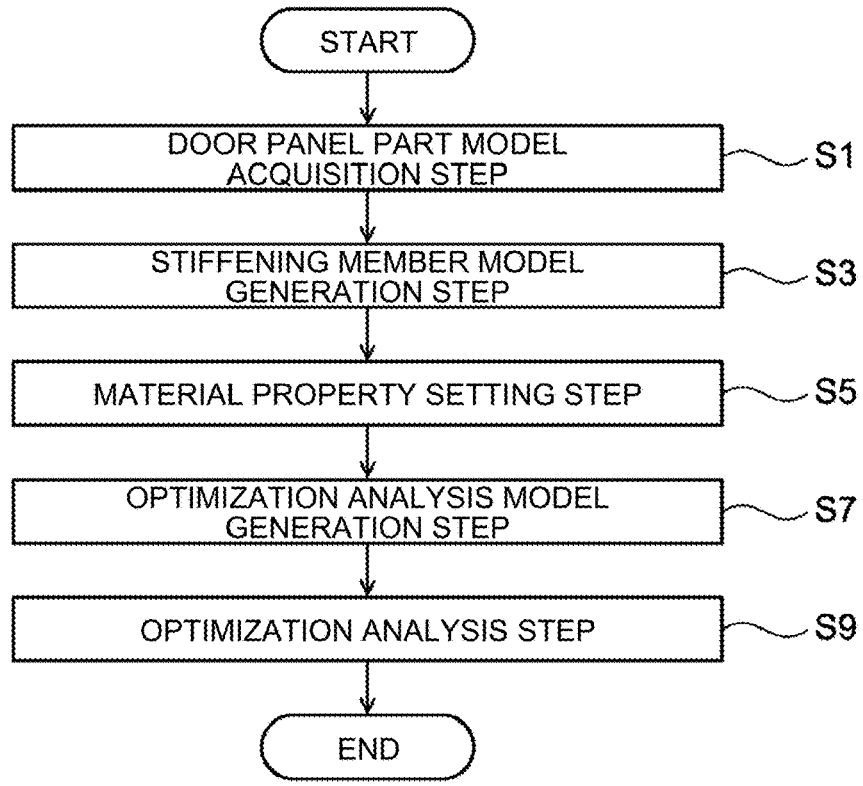
FIG. 2 is a diagram illustrating a processing flow of a topology optimization analysis for obtaining an optimal shape of a stiffening member, in the stiffening structure and the stiffening method for the automotive door panel part according to the present embodiment.

The stiffening structure 1 according to the present embodiment is obtained by performing a topology optimization analysis (for example, see Japanese Patent Application Laid-open No. 2013-25533), and on the basis of the analysis results. The topology optimization analysis is performed by executing step S1 to step S9 illustrated in FIG. 2. The processes performed at steps in FIG. 2 will be described below. For example, step S1 to step S9 may be executed on a computer.

Door Panel Part Model Acquisition Step

A door panel part model acquisition step S1 is a step for acquiring a door outer panel model 23 (FIG. 3) that is obtained by modeling the door outer panel 3, which is the door panel part, using two-dimensional elements and/or three-dimensional elements. In this example, the door outer panel model 23 is curved along the height direction, and in which a character line 23a that extends in the front-rear direction is formed. An impact beam model 25 obtained by modeling the impact beam 5 using two-dimensional elements and/or three-dimensional elements is disposed on the inner surface of the door outer panel model 23. The inner surface of the door outer panel model 23 is an interior surface of an automotive body, when the door outer panel 3 is attached to the automotive body.

The shape of the curve along the height direction of the door outer panel model 23 is not limited to a curve that is curved at a constant curvature. As illustrated in FIG. 3b, the inner surface shape of the door outer panel model 23 may also be a combination of a plurality of curves and planes. Moreover, the inner surface shape of the door outer panel model 23 may be a concave curve or a convex curve formed on the inner surface side.

Stiffening Member Model Generation Step

A stiffening member model generation step S3 is a step for generating a stiffening member model 27 (FIG. 3) that is formed of three-dimensional elements and that is connected to the inner surface of the door outer panel model 23.

Figure 3:
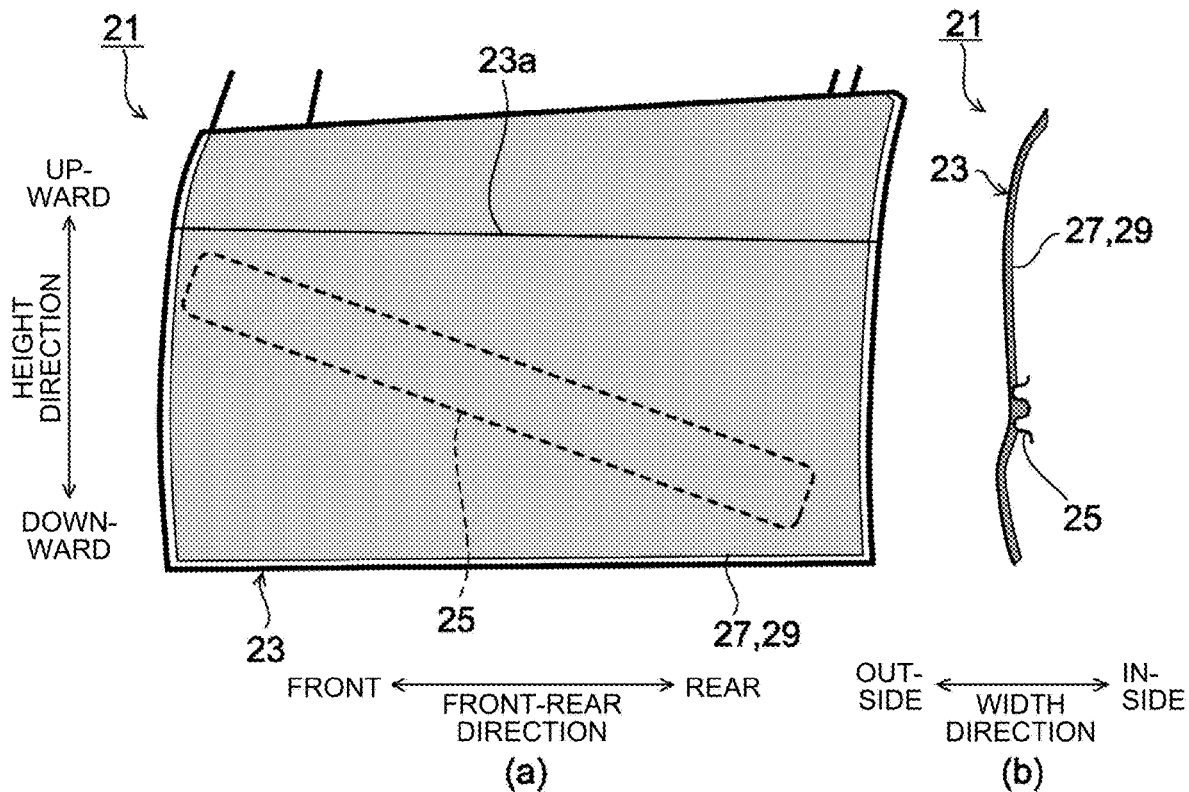
FIG. 3 is a diagram for explaining a design space set by the topology optimization analysis and a generated stiffening member model, in the stiffening structure and the stiffening method for the automotive door panel part according to the present embodiment.

In this example, as illustrated in FIG. 3, the stiffening member model 27 is generated by creating a design space 29 on the inner surface of the door outer panel model 23, and dividing the design space 29 by the three-dimensional elements.

The stiffening member model 27 generated at the stiffening member model generation step S3 is a target of the topology optimization analysis at an optimization analysis model generation step S7, which will be described below. During the topology optimization analysis process, a three-dimensional element placed at a part not necessary for stiffening is eliminated, and a three-dimensional element placed at a part necessary for stiffening is left.

The design space 29 illustrated in FIG. 3 is generated along the inner surface shape of the door outer panel model 23 so as to fill the gap between the door outer panel model 23 and the impact beam model 25.

Material Property Setting Step

A material property setting step S5 is a step for setting the material properties of the stiffening member model 27 generated at the stiffening member model generation step S3.

The present embodiment stiffens the door outer panel 3 made of a metal sheet by the stiffening member 7 made of resin. The material properties set for the stiffening member model 27 at the material property setting step S5 include elastic modulus, Poisson's ratio, density, and the like of resin. Table 1 indicates the values of the elastic modulus, Poisson's ratio, and density set as material properties in the present embodiment.

TABLE 1

| Elastic Modulus (GPa) | Poisson's Ratio (—) | Density (g/cm$^3$) |
|---|---|---|
| 30 | 0.4 | 1.45 |

The material properties indicated in Table 1 are set for the stiffening member model 27 as an example when resin used for the stiffening member 7 is an isotropic material. For example, when the stiffening member 7 is a fiber-reinforced plastic (FRP) having in-plane anisotropic material properties, it is possible to set the in-plane anisotropic material properties of the stiffening member model 27, by providing the angle of principal axis for giving the in-plane anisotropic material properties of the stiffening member model 27, and setting the value of the material property corresponding to the angle of principal axis. Moreover, when the stiffening member 7 is made of resin in which a plurality of layers are laminated, it is possible to generate the stiffening member model 27 in which the layers are laminated, and set the angle of principal axis for each of the layers.

Optimization Analysis Model Generation Step

The optimization analysis model generation step S7 generates an optimization analysis model 21 (see FIG. 3) by connecting the stiffening member model 27 generated at the stiffening member model generation step S3 to the door outer panel model 23.

For example, when the door outer panel model 23 is modeled by two-dimensional elements, the door outer panel model 23 can be connected to the stiffening member model 27, by commonly matching nodes of the three-dimensional elements of the stiffening member model 27 and nodes of the two-dimensional elements of the door outer panel model 23.

Moreover, as described above, in the present invention, at the optimization analysis model generation step S7, the impact beam model 25 may be connected to the stiffening member model 27 using rigid elements.

Optimization Analysis Step

An optimization analysis step S9 is a step for obtaining an optimal shape of the stiffening member model 27, by applying analysis conditions to the optimization analysis model 21 generated at the optimization analysis model generation step S7, and performing the topology optimization analysis on the stiffening member model 27 on which the optimization analysis process is to be carried out.

The analysis conditions applied to the optimization analysis model 21 includes load and constraint conditions for providing the position at which the load is applied to the optimization analysis model 21 and the position at which the displacement is constrained. The analysis conditions also include an objective function set according to the objective of the optimization analysis and a constraint condition.

Figure 4:
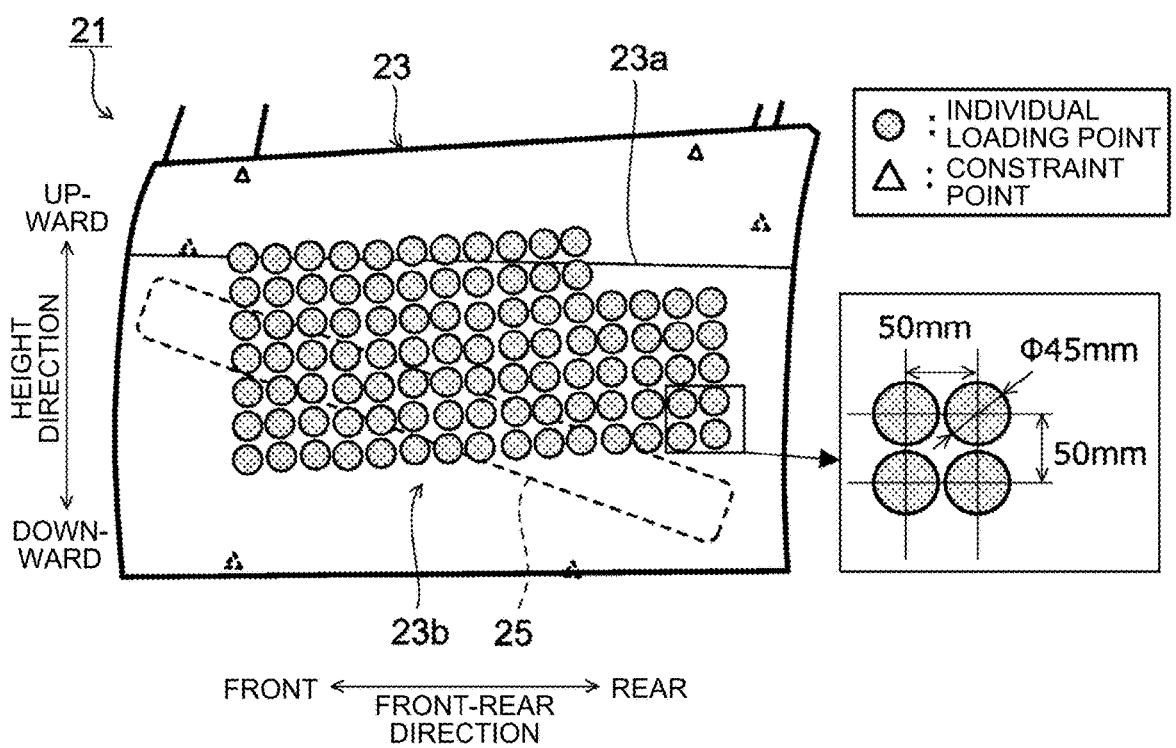
FIG. 4 is a diagram illustrating an example of load and constraint conditions in the topology optimization analysis of a stiffening member, in the stiffening structure and the stiffening method for the automotive door panel part according to the present embodiment.

In the example of topology optimization analysis in the present embodiment, the load and constraint conditions illustrated in FIG. 4 are applied, the objective function is set to the minimum volume, and the constraint condition is set to a displacement of 1.5 mm or less (rigidity value 80 N/mm or more) at the loading point.

As illustrated in FIG. 4, the load and constraint conditions are as follows. To the loading points arranged in a lattice shape at 50 mm intervals in the height direction and the front-rear direction of the door outer panel model 23, a distributed load of 120 N is individually applied in the normal direction of a panel surface part 23b of the door outer panel model 23 from an area of $\phi 45$ mm. The outer surface side of the door outer panel model 23 is constrained at the solid-line triangles, and the inner surfaced side of the door outer panel model 23 is constrained at the dotted-line triangles.

Then, a structural analysis is performed for the case when load is applied to one of each loading points arranged in a lattice shape, and the structural analysis is individually performed on all of the loading points. After combining the structural analyses with which load is applied to each loading points, the volume of the stiffening member model 27 is minimized, and an optimally shaped stiffening member model 31 that is an optimal shape of the stiffening member model 27 is obtained. In this example, equal load is applied to the loading points when the structural analyses are combined.

Moreover, when a density method is applied to the topology optimization analysis at the optimization analysis step S9, it is preferable to perform discretization by setting a penalty coefficient of the element to two or more. Although, at the optimization analysis step S9, the optimization analysis is not only performed by the topology optimization analysis, but the optimization analysis process may also be performed by using the other optimization analysis method. Moreover, for example, the optimization analysis process may also be performed by using analysis software using a commercially available finite element.

Figure 5:
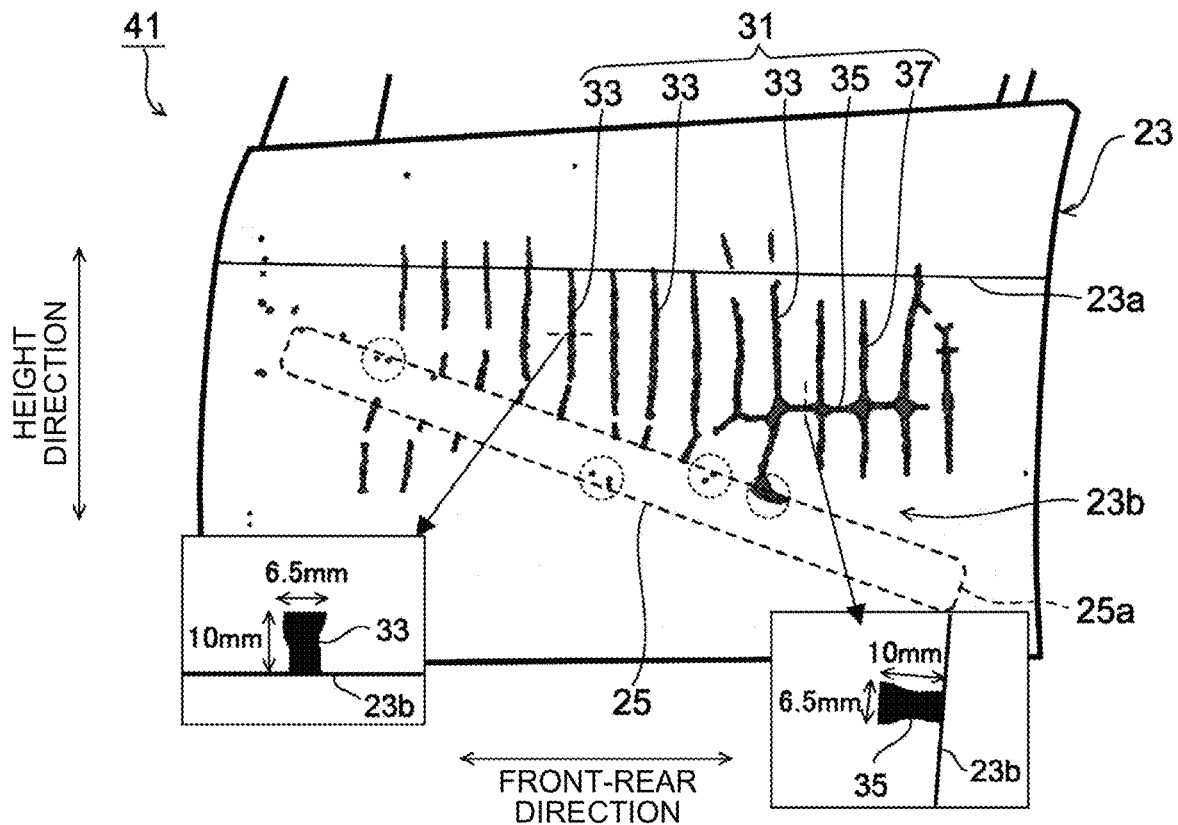
FIG. 5 is a diagram illustrating analysis results indicating an example of a stiffening member model having an optimal shape obtained through the topology optimization analysis, in the stiffening structure and the stiffening method for the automotive door panel part according to the present embodiment.

FIG. 5 illustrates the optimally shaped stiffening member model 31 obtained as the optimal shape of the stiffening member model 27, by executing the topology optimization analysis from step S1 to step S9 described above. The optimally shaped stiffening member model 31 has a fish bone shape including a vertical bone portion 33 that extends in the height direction, and a horizontal bone portion 35 that extends in the direction intersecting with the vertical bone portion 33.

One end of the vertical bone portion 33 is placed at the impact beam model 25, and the other end thereof extends in a streak shape in the height direction so as to be placed at the character line 23a. A plurality of the vertical bone portions 33 are arranged at a predetermined interval in the front-rear direction. The predetermined interval between the adjacent vertical bone portions 33 is substantially the same as the interval between the loading points to which the load is applied by an indenter.

On the other hand, at around the center portion of the door outer panel model 23 in the height direction, the horizontal bone portion 35 extends in the front-rear direction so as to intersect with the vertical bone portions 33. Moreover, resin (part surrounded by a dotted line circle in FIG. 5) left in the form of a mastic sealer is observed in a part where the impact beam model 25 is arranged.

It is considered that the optimally shaped stiffening member model 31 is formed as above because during the topology optimization analysis process, the three-dimensional element is not left in a part where displacement is small, and the three-dimensional element is left so as to support a part where displacement is large.

In particular, in the center portion where a rear end 25a of the impact beam model 25 is placed below the center portion in the height direction, and where the impact beam model 25 is arranged obliquely, the tensile rigidity is low because a large area is not supported by the impact beam model 25. Consequently, it is considered assumed that the horizontal bone portion 35 is left so as to support the area.

Moreover, the optimally shaped stiffening member model 31 illustrated in FIG. 5 is analysis results obtained when the arrangement of the loading points to which the load is applied in the topology optimization analysis is a lattice shape (see FIG. 4). Moreover, the vertical bone portions that extend in a streak shape in the height direction from the impact beam model to the character line and that are disposed at a predetermined interval in the front-rear direction are also observed in the optimally shaped stiffening member model obtained when the similar topology optimization analysis is performed by changing the arrangement of the loading points (for example, arranged in a close-packed state illustrated in FIG. 10).

The arrangement and shape of the vertical bone portions 9 and the horizontal bone portion 11 in the stiffening structure 1 according to the present embodiment can be determined on the basis of the shape of the optimally shaped stiffening member model 31 obtained by performing the topology optimization analysis described above.

In regard to the arrangement of the vertical bone portions 9, as described above, the predetermined interval between the vertical bone portions 33 in the front-rear direction in the optimally shaped stiffening member model 31 corresponds to the interval between the loading points. Consequently, it is possible to set the predetermined interval in the front-rear direction, according to the arrangement of the loading points in the evaluation of the tensile rigidity set at the time of designing the door panel. In this manner, by matching the interval between the vertical bone portions 9 with the interval between the loading points formed by the indenter, it is possible to efficiently transmit the load applied to each of the loading points to the impact beam 5 or the character line 3a via the vertical bone portions 9.

Next, in regard to the shape of the vertical bone portions 9, the vertical bone portions 33 with a width of 6.5 mm and a thickness of 10 mm are observed in the optimally shaped stiffening member model 31 in the present embodiment. Consequently, it is possible to set the width and thickness of the vertical bone portions 9 to 6.5 mm and 10 mm, respectively.

Moreover, in regard to the arrangement of the horizontal bone portion 11, when the impact beam 5 is arranged obliquely as illustrated in FIG. 1, the horizontal bone portion 35 that extends in the direction intersecting with the vertical bone portion 33 is left around the center portion of the optimally shaped stiffening member model 31 in the height direction. Consequently, the horizontal bone portion 11 that extends in the direction intersecting with the vertical bone portions 9 may be provided in the center portion of the door outer panel 3 in the height direction.

In regard to the shape of the horizontal bone portion 11, similar to the vertical bone portions 9, the width and thickness of the horizontal bone portion 35 in the optimally shaped stiffening member model 31 in the present embodiment are 6.5 mm and 10 mm, respectively. Consequently, in the stiffening structure 1, the width and thickness of the horizontal bone portion 11 may also be set to 6.5 mm and 10 mm, respectively.

The reason why the tensile rigidity is improved by the stiffening structure 1 according to the present embodiment is as follows. In the stiffening structure 1, the stiffening member 7 is defined on the basis of the optimally shaped stiffening member model 31 having an optimal shape for reducing the amount of deformation that occurs when the distributed load is applied to the door outer panel 3 (FIG. 1). Thus, the vertical bone portions 9 attaches to the inner surface of the door outer panel 3 so as to transmit the load to the impact beam 5 and the character line 3a when the distributed load is applied to the panel surface part 3b. Consequently, the amount of deformation at the loading point is reduced, and the tensile rigidity is improved.

The above description is based on the optimally shaped stiffening member model 31 obtained by setting a value of 30 GPa as the elastic modulus of the stiffening member model 27 in the topology optimization analysis. And, the elastic modulus of the stiffening member 7 according to the present invention may be set to 10 GPa or more. When the elastic modulus is less than 10 GPa, the width and thickness of the stiffening member 7 is increased, and the weight of the member will be increased. Consequently, it is difficult to reduce the weight. Reducing the weight by setting the elastic modulus of the stiffening member 7 to 10 GPa or more will be specifically explained in Embodiment 2, which will be described below.

Moreover, in the optimally shaped stiffening member model 31, it is observed a vertical bone portion 37 that does not extend from the impact beam model 25 to the character line 23a, but that is arranged at a substantially equivalent interval as that of the vertical bone portions 33, that intersects with the horizontal bone portion 35, and that extends in the height direction. Consequently, the stiffening member 7 may include a vertical bone portion 13 that intersects with the horizontal bone portion 11 in addition to the vertical bone portion 9 (FIG. 1). In this case, the shape of the vertical bone portion 13 may be determined on the basis of the shape of the vertical bone portion 37 in the optimally shaped stiffening member model 31.

Furthermore, in the topology optimization analysis, the horizontal bone portion 35 need not be left. Depending on the arrangement of the impact beam model 25, it may also be obtained an optimally shaped stiffening member model without a part corresponding to the horizontal bone portion 35 intersecting with the vertical bone portions 33. In such a case, the stiffening structure according to the present invention may only include the vertical bone portions 9 that are arranged at a predetermined interval in the front-rear direction. Moreover, the horizontal bone portion may be left at a plurality of locations that intersect with the vertical bone portions, and the stiffening structure according to the present invention may include the horizontal bone portion at a plurality of locations in the center of the door panel.

In the above description, the arrangement and shape of the vertical bone portions 9 and the horizontal bone portion 11 are determined on the basis of the optimally shaped stiffening member model 31 obtained by performing the topology optimization analysis. Then, in the stiffening structure according to the present invention, the arrangement and shape of the vertical bone portions 9 and the horizontal bone portion 11 may be suitably set as follows.

For example, in regard to the predetermined interval between the vertical bone portions 9 in the front-rear direction, the interval between the loading points corresponds to the interval between the vertical bone portions 33, in the topology optimization analysis described above. Thus, the interval between the vertical bone portions 9 may be suitably set according to the arrangement of the loading points, in the evaluation of the tensile rigidity set at the time of designing the door panel.

Moreover, in the topology optimization analysis described above, when the elastic modulus of the stiffening member model 27 is 30 GPa, the width of the vertical bone portions 33 and the horizontal bone portion 35 is about 6.5 mm. When the elastic modulus of the stiffening member model 27 is 10 GPa, the width of the vertical bone portions 33 and the horizontal bone portion 35 is about 15 mm. Hence, the width of the vertical bone portions 9 and the horizontal bone portion 11 may be suitably set according to the elastic modulus of resin used for the stiffening member 7.

Furthermore, in the topology optimization analysis described above, the thickness of the vertical bone portions 9 and the horizontal bone portion 11 is set to 10 mm. However, the thickness of the vertical bone portions 9 and the horizontal bone portion 11 is not limited to the value, and may be suitably set by taking into account the tensile rigidity and weight of the stiffening structure 1.

Still furthermore, in regard to the arrangement of the horizontal bone portion 11, as illustrated in FIG. 1, when a rear end 5a of the impact beam 5 is placed below the center portion in the height direction, and when the impact beam 5 is disposed obliquely, it is preferable to provide the horizontal bone portion 11 so as to extend in the direction intersecting with the vertical bone portions 9 at the center portion.

This is because in the center portion, a large area is not supported by the impact beam 5, and the tensile rigidity is low in the area. Thus, depending on the arrangement of the impact beam 5, it is preferable to arrange the horizontal bone portion 11 in an area where the tensile rigidity is low, because the inner surface side of the door outer panel 3 is not supported by the impact beam 5.

Consequently, by providing the horizontal bone portion 11 that extends in the direction intersecting with the vertical bone portions 9 in a part the inner surface side of which is not supported by the impact beam 5, the distributed load applied to the part can be dispersed. As a result, it is possible to reduce the amount of deformation when the distributed load is applied to the panel surface part 3b of the door outer panel 3, and suitably improve the tensile rigidity.

In the above description, the impact beam 5 is arranged below the center portion in the height direction, and the character line 3a is formed in the upper portion in the height direction. Consequently, the vertical bone portions 9 of the stiffening member 7 extend from the impact beam 5 to the character line 3a upward in the height direction. Moreover, for example, even when the impact beam is disposed in the upper portion in the height direction and the character line is formed in the lower portion in the height direction, the vertical bone portions that extend in a streak shape from the impact beam to the character line may be provided along the curve of the door outer panel.

Moreover, as illustrated in FIG. 1, the stiffening structure according to the present invention may also include the vertical bone portion 13 that intersects with the horizontal bone portion 11 and that extends in a streak shape in the height direction. The end portion of the vertical bone portion 13 may not be placed at the impact beam 5 or the character line 3a. The stiffening structure may also include the vertical bone portion 9 that extends from the impact beam 5 to the character line 3a instead of the vertical bone portion 13.

In the above description, the door outer panel made of a metal sheet is stiffened as the door panel part. And, the present invention may also connect a stiffening member made of resin to a door panel part including a door outer panel and a door inner panel. The combination of materials of the door outer panel and the door inner panel may be one of metal and metal, resin and resin, metal and resin, and resin and metal.

Figure 13:
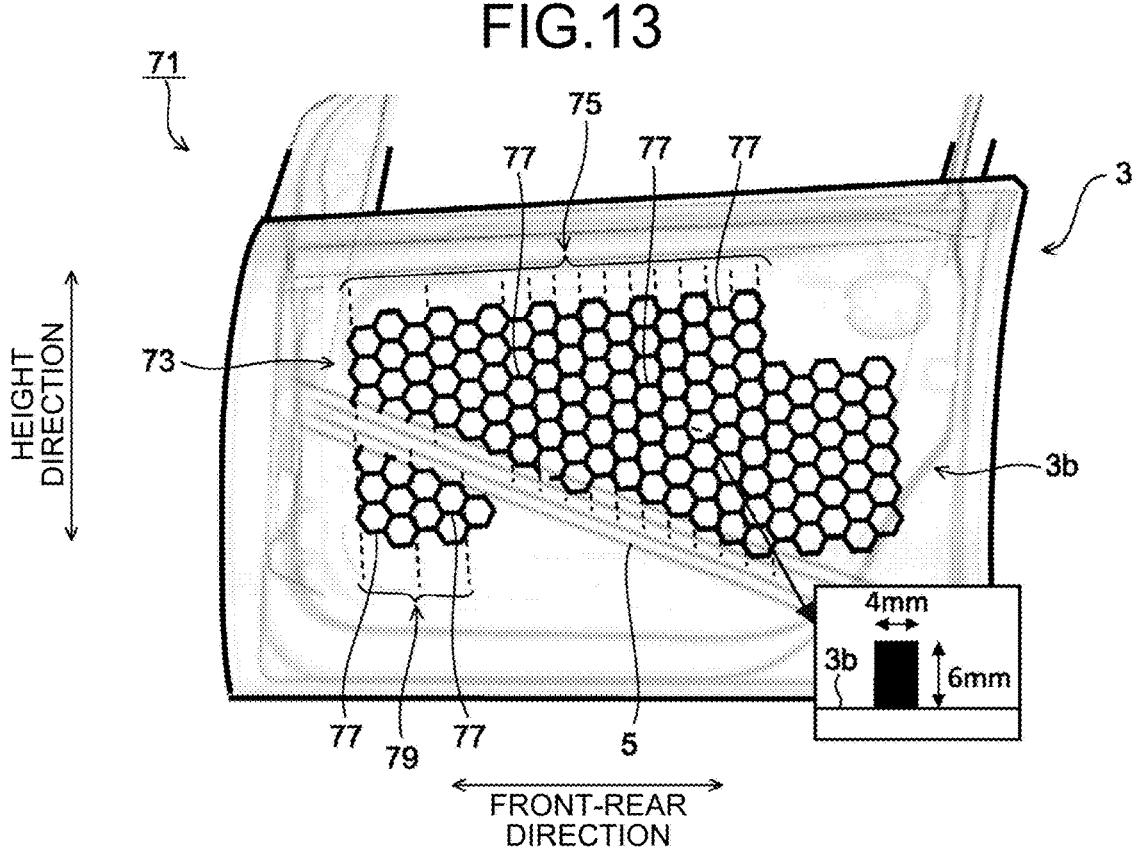
FIG. 13 is a diagram illustrating another aspect of the stiffening member in the stiffening structure for the automotive door panel part according to the present embodiment (first example).
Figure 14:
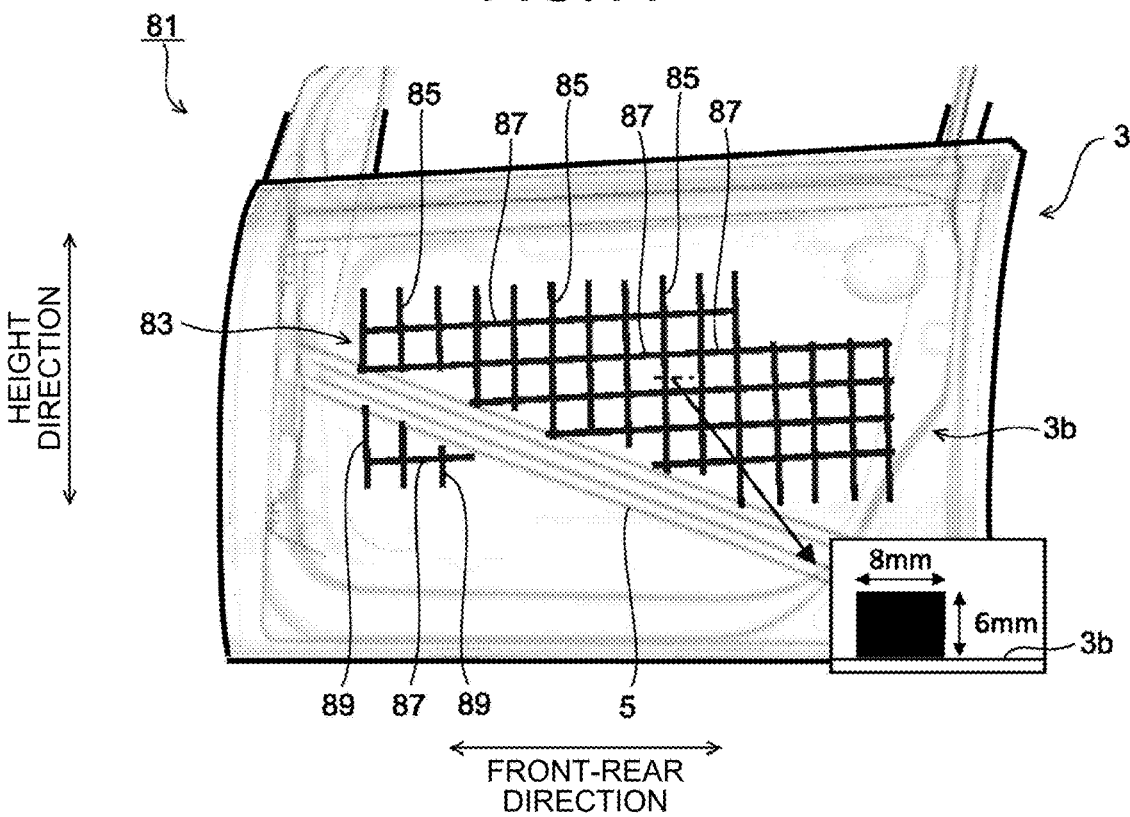
FIG. 14 is a diagram illustrating another aspect of the stiffening member in the stiffening structure for the automotive door panel part according to the present embodiment (second example).

Moreover, as illustrated in FIG. 13, the present invention may also have a stiffening structure 71 obtained by connecting a stiffening member 73 in which a substantially straight shape vertical bone portion 75 and a horizontal bone portion 77 form a honeycomb shape. Alternatively, as illustrated in FIG. 14, the present invention may also have a stiffening structure 81 obtained by connecting a stiffening member 83 in which a vertical bone portion 85 and a horizontal bone portion 87 form a lattice shape. It is preferable to form the stiffening member in a simple shape such as the stiffening member 73 and the stiffening member 83 in which a plurality of the vertical bone portions that extend in a streak shape from the impact beam 5 to the character line 3a and the horizontal bone portion intersecting the vertical bone portions are arranged regularly, to manufacture the stiffening member.

Furthermore, in the above description, as illustrated in FIG. 1, the vertical bone portions 9 extend upward in the height direction toward the character line 3a that is placed above the impact beam 5. And, as illustrated in FIG. 13 and FIG. 14, for example, the stiffening structure for the automotive door panel part according to the present invention may also include a vertical bone portion 79 or a vertical bone portion 89 that extend downward in a streak shape in the height direction from the impact beam 5, in a door panel part (not illustrated) in which the character line is formed below the impact beam.

Stiffening Method for Automobile Door Panel Part

Next, a stiffening method for an automotive door panel part according to the present embodiment will be described.

Figure 6:
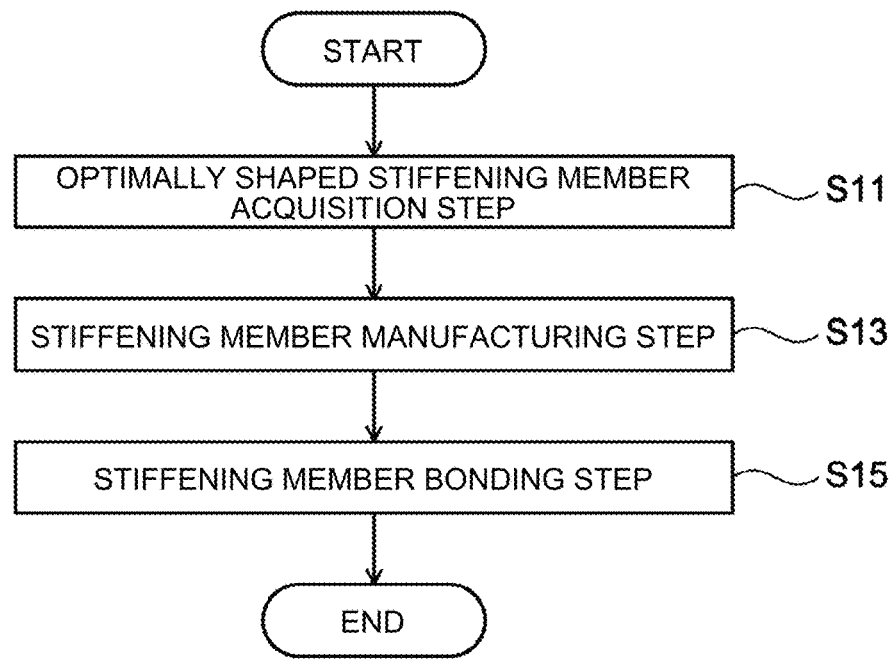
FIG. 6 is a diagram illustrating a processing flow of the stiffening method for the automotive door panel part according to the present embodiment.

The stiffening method for the automotive door panel part according to the present embodiment is used to improve tensile rigidity by attaching a stiffening member to the inner surface of a door panel part made of a metal sheet that is curved in the height direction, and the inner surface side of which is disposed with an impact beam. As illustrated in FIG. 6, the stiffening method for the automotive door panel part includes an optimally shaped stiffening member acquisition step S11, a stiffening member manufacturing step S13, and a stiffening member bonding step S15.

Hereinafter, each of the steps described above will be explained, when the door outer panel 3 illustrated in FIG. 1 is stiffened as the door panel part.

Optimally shaped stiffening Member Acquisition Step

The optimally shaped stiffening member acquisition step S11 is a step for performing an optimization analysis to obtain an optimal shape of the stiffening member model 27, by acquiring the door outer panel model 23 obtained by modeling the door outer panel 3 by two-dimensional elements and/or three-dimensional elements, and connecting the stiffening member model 27 that is a target of the optimization analysis, to the door outer panel model 23.

The topology optimization analysis method described above can be applied to the optimization analysis. By executing step S1 to step S9 illustrated in FIG. 2, the optimally shaped stiffening member model 31 (see FIG. 5), which is the optimal shape of the stiffening member model 27, can be obtained.

Stiffening Member Manufacturing Step

The stiffening member manufacturing step S13 is a step for manufacturing the stiffening member 7 to be bonded to the inner surface of the door outer panel 3, on the basis of the optimally shaped stiffening member model 31 obtained at the optimally shaped stiffening member acquisition step S11. The stiffening member 7 includes the vertical bone portions 9 that extend in a streak shape from the impact beam 5 to the character line 3a along the curve of the door outer panel 3 in the height direction, and that are arranged at a predetermined interval in the front-rear direction of the door outer panel 3.

In the optimally shaped stiffening member model 31 illustrated in FIG. 5, the interval between the vertical bone portions 33 in the front-rear direction is about 50 mm, and width and thickness of the vertical bone portions 33 are about 6.5 mm and 10 mm, respectively. The interval, width, and thickness may be set as the arrangement and shape of the vertical bone portions 9 of the stiffening member 7.

Moreover, in the optimally shaped stiffening member model 31, the horizontal bone portion 35 with a width and thickness of about 6.5 mm and 10 mm, respectively, extends around the center portion in the height direction. Consequently, in the stiffening member 7, it is possible to provide the horizontal bone portion 11 that extends in the direction intersecting with the vertical bone portions 9 around the center portion in the height direction, and set the width and thickness of the horizontal bone portion 11 to 6.5 mm and 10 mm, respectively.

In the optimally shaped stiffening member model 31, the object to be analyzed is the door outer panel model 23 illustrated in FIG. 3. Moreover, the optimally shaped stiffening member model 31 is an example of analysis results obtained under the load and constraint conditions illustrated in FIG. 4. Thus, when various conditions such as the door outer panel 3 to be stiffened, the load and constraint conditions and the optimization analysis conditions for evaluating the tensile rigidity, and the like are changed, the arrangement, shape, thickness, and width of the vertical bone portions 9 and the horizontal bone portion 11 of the stiffening member 7 may be set, on the basis of the optimally shaped stiffening member model 31 obtained by performing the topology optimization analysis under those conditions. It is to be noted that the thickness and width may not be constant in the stiffening member.

In the above description, the stiffening member 7 includes the horizontal bone portion 11. Moreover, for example, depending on the arrangement of the impact beam 5 at the inner surface side of the door outer panel 3, which is to be stiffened, the optimally shaped stiffening member model 31 in which a part corresponding to the horizontal bone portion 35 is not left, may be obtained. In such a case, only the vertical bone portions 9 serving as the stiffening member 7 may be bonded to the inner surface of the door outer panel 3.

In the optimally shaped stiffening member model 31, it is observed the vertical bone portion 37 that does not extend from the impact beam model 25 to the character line 23*a*, but is arranged at an interval substantially equal to that of the vertical bone portions 33, that intersects with the horizontal bone portion 35, and that extends in the height direction. Thus, in the stiffening member 7 manufactured at the stiffening member manufacturing step S13, the vertical bone portion 13 that intersects with the horizontal bone portion 11 may also be provided in addition to the vertical bone portions 9.

The vertical bone portion 9 that extends from the impact beam 5 to the character line 3*a* may also be provided so as to intersect with the horizontal bone portion 11, instead of the vertical bone portion 13. The shape of the stiffening member 7 may be determined in view of the tensile rigidity and weight to be obtained.

In this manner, the stiffening member 7 manufactured at the stiffening member manufacturing step S13 is not limited to that being manufactured so as to have the same shape as that of the optimally shaped stiffening member model 31, but may include the vertical bone portions 9 and the horizontal bone portion 11, if necessary. Moreover, the vertical bone portion 9 may intermittently extend in the vertical direction, as long as the load applied to the panel surface part 3*b* is transmitted to the impact beam 5 and the character line 3*a* via the vertical bone portion 9.

Moreover, an end of the vertical bone portion 9 at the impact beam 5 side may be formed so as to fill the gap between the inner surface of the door outer panel 3 and the impact beam 5. Because it is possible to replace the conventionally used mastic sealer with the end of the vertical bone portion 9, the weight can be reduced.

Stiffening Member Bonding Step

The stiffening member bonding step S15 is a step for bonding the outer surface of the stiffening member 7 manufactured at the stiffening member manufacturing step S13 to the inner surface of the door outer panel 3. For example, the stiffening member 7 can be attached to the inner surface of the door outer panel 3 using an adhesive agent.

As described above, with the stiffening structure and method for the automotive door panel part according to the present embodiment, it is possible to reduce the amount of deformation when the distributed load is applied to a door panel part, and improve the tensile rigidity of the door panel part. Moreover, when the shape of the stiffening member is determined on the basis of the results of the optimization analysis, by reducing the sheet thickness of the metal sheet of the door panel part, it is possible to reduce the weight of the entire door panel part, while improving the tensile rigidity of the door panel part than that of the door panel part before the sheet thickness is reduced. Improvement of tensile rigidity and effects of reducing weight by the present invention will be specifically described in Embodiment 1 and Embodiment 2, which will be described below.

Similar to the stiffening structure for the automotive door panel part according to the present embodiment described above, in the above description, the door outer panel is stiffened as the door panel part. Moreover, the stiffening method for the automotive door panel part according to the present invention may stiffen the door panel part including the door outer panel and the door inner panel. In the door panel part, the combination of materials of the door outer panel and the door inner panel may be one of metal and metal, resin and resin, metal and resin, and resin and metal.

Embodiment 1

An experiment performed to confirm the effects of the present invention will be described. In the present Embodiment 1, as Example 1, to improve tensile rigidity and reduce weight of the door outer panel 3 illustrated in FIG. 1, the topology optimization analysis was performed to obtain an optimal shape of the stiffening member model 27 that is to be attached to the inner surface of the door outer panel model 23 made of a metal sheet (steel sheet) which thickness was reduced. Then, tensile rigidity and change in weight of a tensile rigidity evaluation model 41, which is obtained by connecting the optimally shaped stiffening member model 31 obtained through the topology optimization analysis to the door outer panel model 23, were determined. In this example, the optimal shape of the stiffening member model 27 is the optimally shaped stiffening member model 31 obtained through the topology optimization analysis method (see FIG. 2) described in the above embodiment.

Similar to the embodiment described above, in the analysis conditions of the optimization analysis for obtaining the optimally shaped stiffening member model 31, the load and constraint conditions illustrated in FIG. 4 are applied, and the objective function was set to the minimum volume, and the constraint condition was set to a displacement of 1.5 mm or less at the loading point, as the optimization analysis conditions. Moreover, an isotropic material was used for the stiffening member model 27, and the values indicated in Table 1 described above were set as the material properties.

Figure 7:
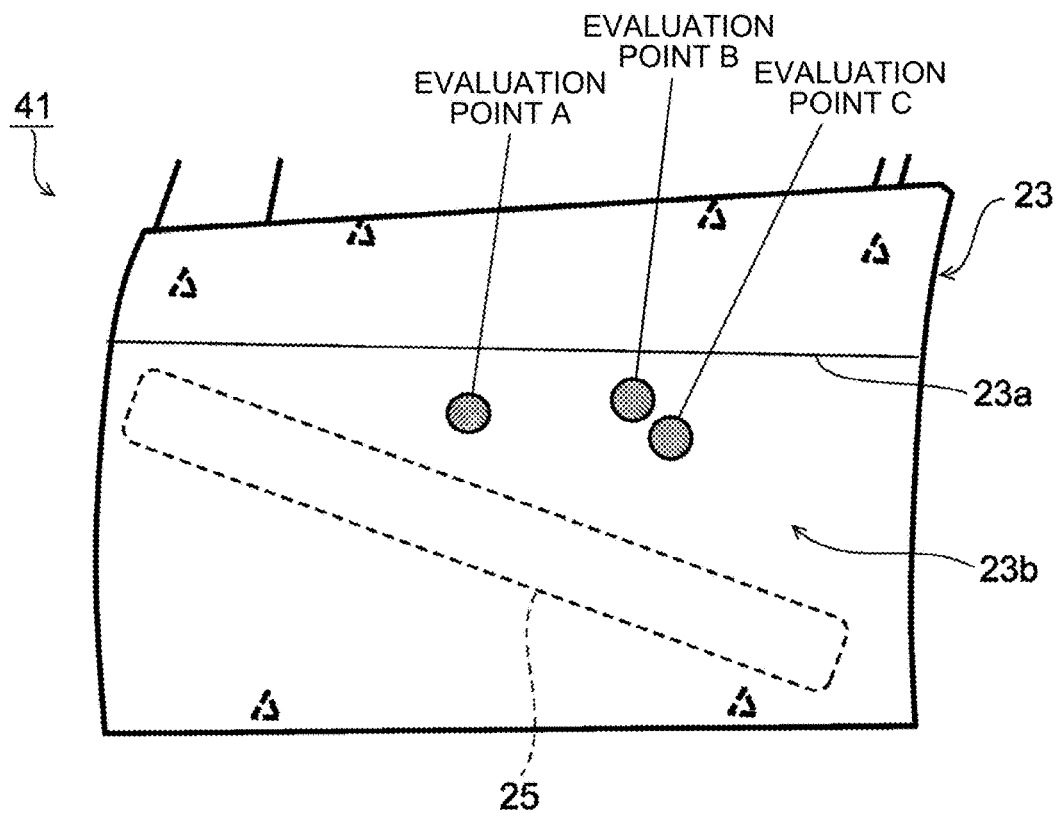
FIG. 7 is a diagram for explaining an evaluation method and evaluation points of tensile rigidity, in Embodiment 1.

In the present Embodiment 1, the tensile rigidity was evaluated as follows. FIG. 7 indicates the positions of an evaluation point A, an evaluation point B, and an evaluation point C for evaluating the tensile rigidity of the door outer panel model 23, and constraint positions (triangles in FIG. 7) in the tensile rigidity evaluation. A tensile rigidity value was calculated by the following expression using the load applied to the evaluation points (evaluation point A to evaluation point C) illustrated in FIG. 7 by an indenter, and the displacement at each of the evaluation points.

Tensile rigidity value (N/mm)=load (N)/displacement (mm) at each evaluation point The constraint condition of displacement when the load of 120 N is applied in the topology optimization analysis was set to 1.5 mm or less. The reference value of the tensile rigidity value was set to 80 N/mm, and the tensile rigidity value equal to or more than the reference value was considered as an excellent tensile rigidity value.

In regard to evaluating reduction in weight, the reduction of the sheet thickness of the door outer panel model 23 and the change in weight by connecting the optimally shaped stiffening member model 31 were calculated. In the present Embodiment 1, the sheet thickness of the door outer panel model 23 was reduced from 0.6 mm to 0.5 mm, and thus the weight of the door outer panel model 23 was reduced as much as 603 grams. Consequently, the change in weight by connecting the optimally shaped stiffening member model 31 is a value obtained by adding the weight of the optimally shaped stiffening member model 31 to the reduction amount (−603 grams) due to reduction in the sheet thickness.

Figure 8:
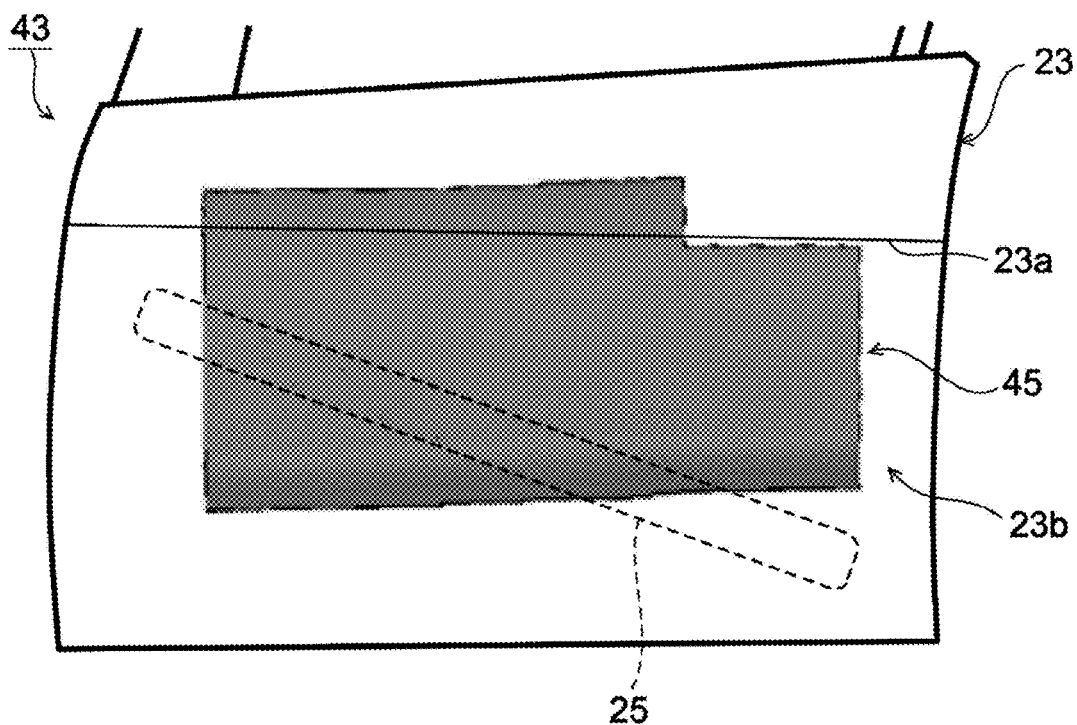
FIG. 8 is a diagram for explaining a tensile rigidity evaluation model according to Comparison Example 1 for comparison, in Embodiment 1.
Figure 9:
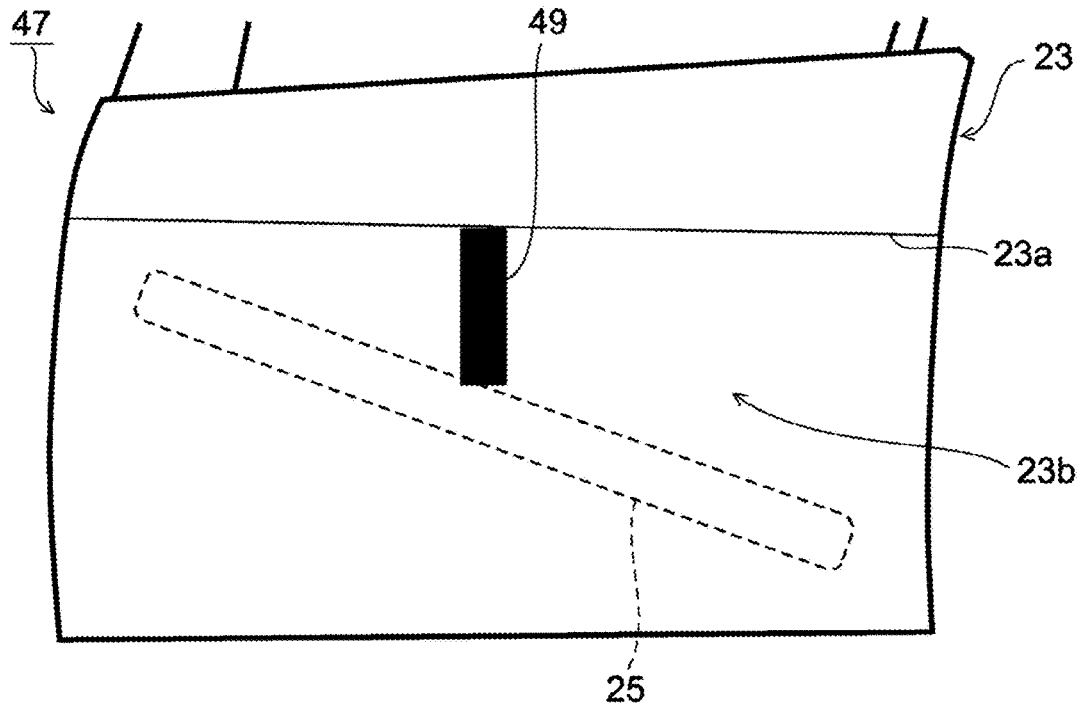
FIG. 9 is a diagram for explaining a tensile rigidity evaluation model according to Comparison Example 2 for comparison, in Embodiment 1.

In the present Embodiment 1, for comparison, as illustrated in FIG. 8, a tensile rigidity evaluation model 43, which is obtained by connecting a stiffening member model 45 having a substantially rectangular-shape to the inner surface of the door outer panel model 23, is serving as Comparison Example 1. Moreover, as illustrated in FIG. 9, a tensile rigidity evaluation model 47 connecting a stiffening member model 49 that only includes a part of the vertical bone portion extending in the height direction from the center portion of the impact beam model 25 in the front-rear direction, is serving as Comparison Example 2. Similar to Example 1, the tensile rigidity and the change in weight were determined for the tensile rigidity evaluation model 43 and the tensile rigidity evaluation model 47.

Table 2 indicates the results of the tensile rigidity values and the change in weight obtained for Example 1 the sheet thickness of which was reduced to 0.5 mm, Comparison Example 1, Comparison Example 2, and the door outer panel model 23 to which the stiffening member model was not connected and the sheet thickness of which was kept to 0.6 mm serving as Conventional Example.

TABLE 2

| No | Sheet Thickness of Metal Sheet (mm) | Shape of Stiffening Member | Tensile Rigidity Value (N/mm) | | | Weight of Stiffening Member (g) | Change in Weight (g) |
|---|---|---|---|---|---|---|---|
| | | | Evaluation Point A | Evaluation Point B | Evaluation Point C | | |
| Conventional Example | 0.6 | Without Stiffening Member | 38 | 41 | 26 | 0 | 0 |
| Example 1 | 0.5 | FIG. 5 | 95 | 113 | 129 | 136 | −467 |
| Comparison Example 1 | 0.5 | FIG. 8 | 1065 | 930 | 870 | 3618 | +3015 |
| Comparison Example 2 | 0.5 | FIG. 9 | 91 | 28 | 18 | 50 | −553 |

Comparison Example 1 is obtained by connecting the stiffening member model 45 having a shape that spreads across the entire inner surface side of the door outer panel model 23. In Comparison Example 1, the tensile rigidity values at all evaluation points satisfy the reference value. However, the weight of the stiffening member model 45 was 3618 grams, and the change in weight was +3015 grams. Thus, the weight was significantly increased when the stiffening member model 45 was used.

Comparison Example 2 is obtained by connecting the stiffening member model 49 having a shape that extends in the height direction to the center portion of the door outer panel model 23. In Comparison Example 2, the weight of the stiffening member model 49 was 50 grams, and the change in weight was −553 grams. Thus, the weight was reduced than that of Conventional Example. And, in regard to the tensile rigidity values, the tensile rigidity value at the evaluation point A exceeds that of Conventional Example and satisfies the reference value, because the stiffening member model 49 attaches to the inner surface side. However, the tensile rigidity values at the evaluation point B and the evaluation point C fell below the tensile rigidity value in Conventional Example, and is significantly out of the reference value.

In Example 1, the optimally shaped stiffening member model 31 the optimal shape of which is obtained through the topology optimization is connected to the door outer panel model 23 in which the sheet thickness is reduced to 0.5 mm, and the tensile rigidity values have favorable results as the values have exceeded the reference value at all the evaluation points. Moreover, the weight of the optimally shaped stiffening member model 31 was 136 grams, and the change in weight was −467 grams. Consequently, the weight was reduced than that of Conventional Example.

As described above, by using the stiffening structure and stiffening method for the automotive door panel part according to the present invention, and bonding the stiffening member made of resin having an optimal shape, and reducing the sheet thickness of the door panel part made of a metal sheet, it was proved that it is possible to improve the tensile rigidity and reduce weight of the door panel part.

Embodiment 2

Embodiment 2 obtains an optimally shaped stiffening member model in which the arrangement of the loading points for evaluating the tensile rigidity of the door outer panel is different from that in Embodiment 1 described above, and determines the tensile rigidity and the change in weight for the tensile rigidity evaluation model that is obtained by connecting the obtained optimally shaped stiffening member model to the door outer panel model. Moreover, for the obtained optimally shaped stiffening member model, Embodiment 2 evaluates the tensile rigidity of the tensile rigidity evaluation model when the elastic modulus was changed, and examines a preferable range of the elastic modulus of resin used for the stiffening member.

Figure 10:
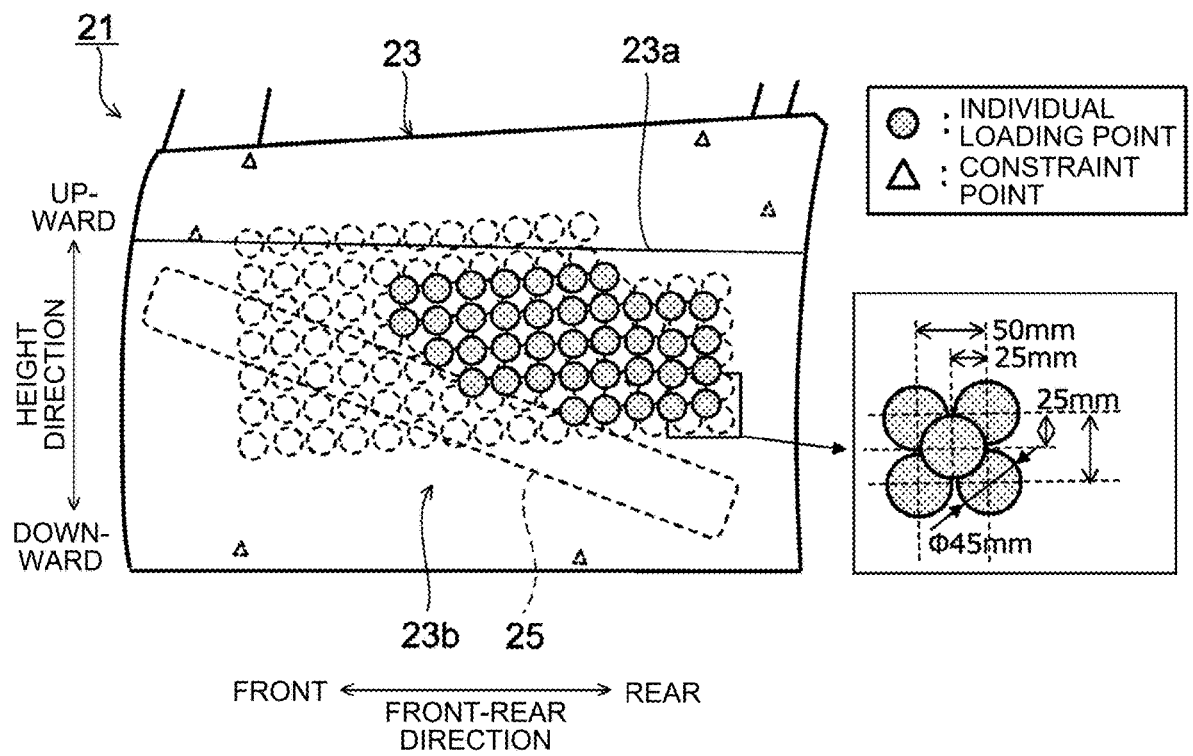
FIG. 10 is a diagram illustrating load and constraint conditions in the topology optimization analysis of a stiffening member, in Embodiment 2.

In Embodiment 2, as a case in which the arrangement of the loading points for evaluating the tensile rigidity is different, the topology optimization analysis (see FIG. 2) described in the above embodiment was performed by providing the load and constraint conditions illustrated in FIG. 10. As the load and constraint condition, as illustrated in FIG. 10, loading points (dotted lines in FIG. 10) arranged in a lattice shape and loading points (solid lines in FIG. 10) arranged at the center of boxes in the lattice are set. To each of the loading points, the distributed load of 120 N was individually applied in the normal direction of the panel surface part 23b of the door outer panel model 23 from an area of ϕ45 mm. The outer surface side of the door outer panel model 23 was constrained at the solid-line triangles, and the inner surface side of the door outer panel model 23 was constrained at the dotted line triangles.

In the topology optimization analysis, the values indicated in Table 1 described above were set as the material properties of the stiffening member model 27. Moreover, similar to Embodiment 1, the objective function was set to the minimum volume, and the constraint condition was set to a displacement of 1.5 mm or less at the loading point, as the optimization analysis conditions. Then, a structural analysis was performed when load is applied to one of the loading points arranged as illustrated in FIG. 10, and the structural analysis was individually performed on all of the loading points. Then, after integrating the structural analyses of applying load to the loading points, the volume of the stiffening member model 27 (FIG. 3) was minimized. In this example, equal weighting was applied to the loading points when the structural analyses were integrated.

Figure 11:
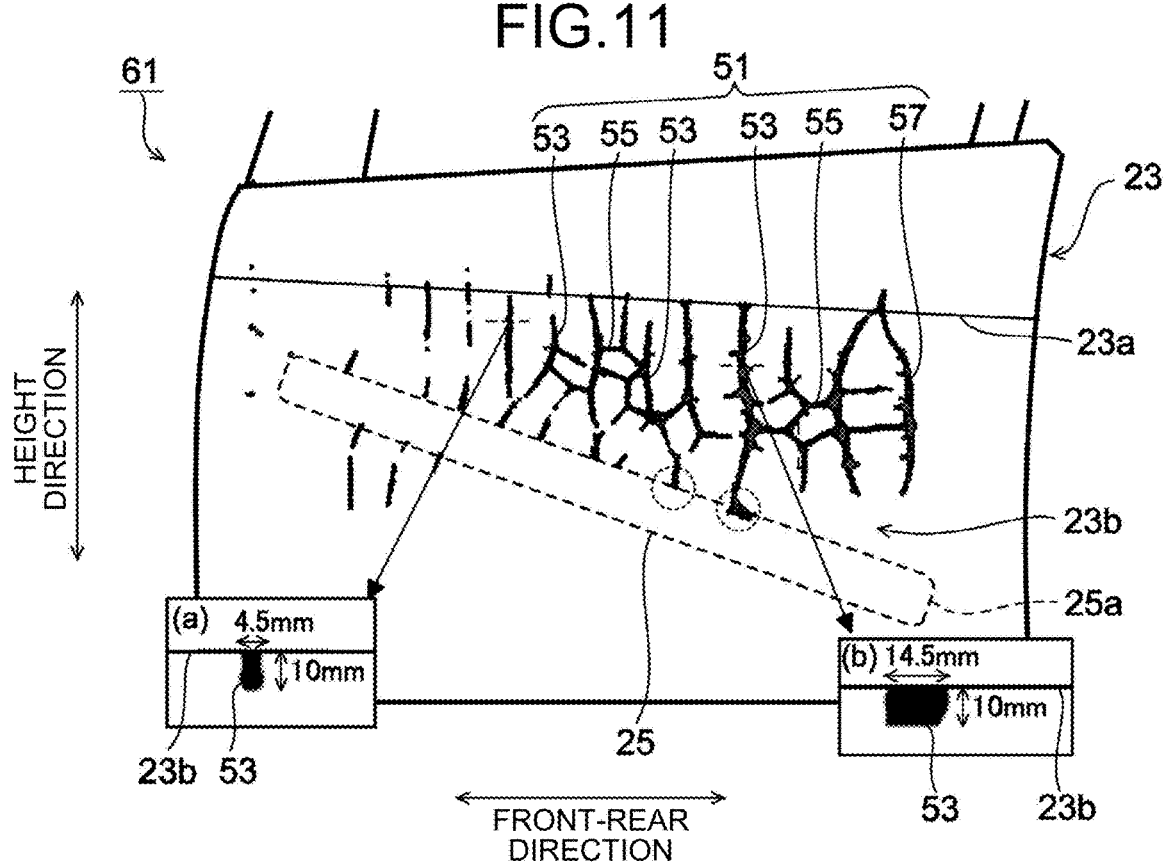
FIG. 11 is a diagram illustrating a stiffening member model having an optimal shape obtained through the topology optimization analysis, in Embodiment 2.
Figure 12:
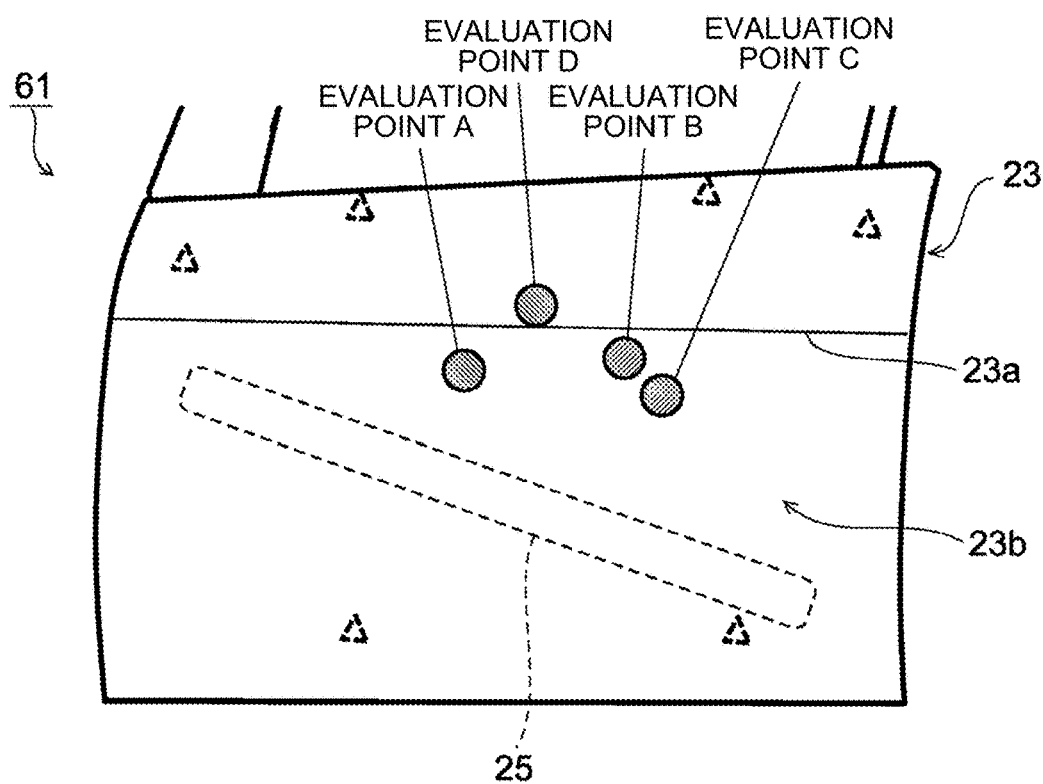
FIG. 12 is a diagram for explaining an evaluation method and evaluation points of tensile rigidity, in Embodiment 2.

FIG. 11 illustrates an optimally shaped stiffening member model 51 obtained by performing a topology optimization analysis by providing the load and constraint conditions illustrated in FIG. 10. Similar to the optimally shaped stiffening member model 31 illustrated in FIG. 5, the optimally shaped stiffening member model 51 has a fish bone shape including a vertical bone portion 53 that extends in a streak shape in the height direction, and a horizontal bone portion 55 that extends in the direction intersecting with the vertical bone portion 53.

adding an evaluation point D to the evaluation points A to C similar to those in Embodiment 1 at the evaluation points illustrated in FIG. 12, and using the applied load and the displacement at each of the evaluation points when the load was inputted. In Embodiment 2 also, from the constraint condition of displacement in the topology optimization analysis, the reference value of the tensile rigidity value was set to 80 N/mm, and the tensile rigidity value equal to or more than the reference value was considered as an excellent tensile rigidity value. Moreover, similar to Embodiment 1, the reduction in weight was evaluated by the change in weight, when the optimally shaped stiffening member model 51 was connected to the door outer panel model 23 in which the sheet thickness was reduced from 0.6 mm to 0.5 mm. Table 3 indicates the results of the tensile rigidity values and the change in weight of the tensile rigidity evaluation model 61.

TABLE 3

| No | Sheet Thickness of Metal Sheet (mm) | Shape of Stiffening Member | Elastic Modulus (GPa) | Tensile Rigidity Value (N/mm) | | | | Weight of Stiffening Member (g) | Change in Weight (g) |
| --- | --- | --- | --- | --- | --- | --- | --- | --- | --- |
| | | | | Evaluation Point A | Evaluation Point B | Evaluation Point C | Evaluation Point D | | |
| Conventional Example | 0.6 | Without Stiffening Member | — | 38 | 41 | 26 | 83 | 0 | 0 |
| Example 2 | 0.5 | FIG. 11 | 30 | 100 | 111 | 106 | 93 | 103 | −500 |
| Example 3 | 0.5 | FIG. 11 | 10 | 80 | 95 | 83 | 87 | 103 | −500 |
| Example 4 | 0.5 | FIG. 11 | 50 | 117 | 121 | 124 | 97 | 103 | −500 |
| Example 5 | 0.5 | FIG. 11 | 200 | 165 | 141 | 171 | 107 | 103 | −500 |
| Comparison Example 3 | 0.5 | FIG. 11 | 8 | 64 | 81 | 65 | 81 | 103 | −500 |

An end of the vertical bone portion 53 is placed on the impact beam model 25, and the other end thereof is placed on the character line 23a. A plurality of the vertical bone portions 53 are arranged in the front-rear direction of the door outer panel model 23. Moreover, the width of the vertical bone portion 53 is 4.5 mm at the front side of the door outer panel model 23 ((a) in FIG. 11), and is 14.5 mm at the rear side ((b) in FIG. 11). Unlike the optimally shaped stiffening member model 31 in FIG. 5, the width of the vertical bone portion 53 differs depending on the position in the front-rear direction.

Moreover, the optimally shaped stiffening member model 51 illustrated in FIG. 11 further includes a vertical bone portion 57 that extends in a streak shape in the height direction around the center portion in the height direction of the door outer panel model 23 at the rear side. This is because the rear end 25a of the impact beam model 25 is placed below the center portion in the height direction, and the impact beam model 25 is arranged obliquely, an area that is not supported by the impact beam model 25 is increased, and the tensile rigidity is lowered. Consequently, it is considered that the vertical bone portion 57 is left in the topology optimization analysis so as to support the area.

Next, the tensile rigidity and reduction in weight were evaluated for a tensile rigidity evaluation model 61 obtained by connecting the optimally shaped stiffening member model 51 illustrated in FIG. 11 to the door outer panel model 23 the sheet thickness of which is reduced to 0.5 mm.

The tensile rigidity of the tensile rigidity evaluation model 61 was evaluated by the tensile rigidity values calculated by In Table 3, similar to Embodiment 1 described above, Conventional Example is results of the door outer panel model 23 to which the stiffening member model is not connected and the sheet thickness of which is kept to 0.6 mm. Moreover, Example 2 is results of the tensile rigidity evaluation model 61, which is obtained by connecting the optimally shaped stiffening member model 51 obtained by providing the material properties indicated in Table 1, to the stiffening member model 27. Moreover, Example 3, Example 4, and Example 5 are the results obtained when only the elastic modulus of the connected optimally shaped stiffening member model 51 is changed to 10 GPa or more (10 GPa, 50 GPa, and 200 GPa), which is a preferable range, in the tensile rigidity evaluation model 61, which is obtained by connecting the optimally shaped stiffening member model 51 having the same shape as that in Example 2 to the door outer panel model 23. Moreover, Comparison Example 3 is the results of the tensile rigidity evaluation model 61 to which the optimally shaped stiffening member model 51 having the same shape as that in Example 2 is connected, and the results are within the range of the present invention. Comparison Example 3 is also the results when only the elastic modulus of the optimally shaped stiffening member model 51 was set to 8 GPa, which is outside of the preferable range of the present invention.

As indicated in Table 3, in Example 2 to Example 5, the tensile rigidity values have exceeded the reference value (=80 N/mm) at all evaluation points (evaluation point A to evaluation point D). Moreover, the weight of the optimally shaped stiffening member model 51 was 103 grams, and the change in weight was −500 grams. Consequently, the weight was reduced than that of Conventional Example.

Comparison Example 3 is obtained by connecting the optimally shaped stiffening member model 51 having the same shape as that of Example 2. Thus, the change in weight was −500 grams compared to that in Conventional Example. However, in regard to the tensile rigidity values, the tensile rigidity values have exceeded the reference value (=80 N/mm) at the evaluation point B and the evaluation point D, but the tensile rigidity values fell below the reference value at the evaluation point A and the evaluation point C. Consequently, not at all of the evaluation points, the tensile rigidity values exceeded the reference value.

Although, as indicated in Table 3, the tensile rigidity values at the evaluation point A to evaluation point C in Comparison Example 3 have improved than those in Conventional Example, and the tensile rigidity value at the evaluation point D was substantially equivalent to that of Conventional Example. As a result, even when the elastic modulus of the optimally shaped stiffening member was set to a value lower than the preferable range of the present invention, it was proved that it is possible to improve the overall tensile rigidity and reduce weight than those of Conventional Example.

Moreover, Table 3 indicates the results of an increase in the tensile rigidity value when the elastic modulus of the optimally shaped stiffening member model 51 is increased. This suggests that by increasing the elastic modulus of resin used for the stiffening member, it is possible to reduce the weight of the stiffening member within a range in which the tensile rigidity value satisfies the reference value, and further reduce the weight of the door panel part. Then, when the weight is further reduced by increasing the elastic modulus of resin used for the stiffening member, from the results indicated in Table 3, it is preferable to use resin having elastic modulus of 10 GPa or more, so as the tensile rigidity values at the evaluation points satisfy the reference value. Resin having elastic modulus of 10 GPa or more includes fiber-reinforced resin.

Example 3 to Example 5 and Comparison Example 3 indicated in Table 3 are the evaluation results of the tensile rigidity, by obtaining the optimally shaped stiffening member model 51 by the topology optimization analysis in which the elastic modulus of the stiffening member model was set to 30 GPa, and only changing the elastic modulus of the obtained optimally shaped stiffening member model 51. From these results, it is suggested that the elastic modulus set for the stiffening member model in the topology optimization analysis for obtaining the optimally shaped stiffening member model may be set to 10 GPa or more.

As described above, even when the arrangement of the loading points for evaluating the tensile rigidity set at the time of designing the door panel part is different, it was proved that the stiffening member model having an optimal shape for stiffening the door panel part may have a fish bone shape including the vertical bone portion that extends in the height direction of the door panel part, and the horizontal bone portion that extends in the direction intersecting with the vertical bone portion. It was also proved that it is possible to improve the tensile rigidity and reduce the weight, by connecting the stiffening member made of resin that has an optimal shape, and reducing the sheet thickness of the door panel part. Moreover, it was proved that it is preferable to set the elastic modulus of the stiffening member having an optimal shape to 10 GPa or more, to improve the tensile rigidity of the door panel part.

Embodiment 3

To evaluate the tensile rigidity of the material of the door outer panel made of a metal sheet that has different material from that in Embodiment 1 and Embodiment 2, Embodiment 3 obtains the optimally shaped stiffening member model made of aluminum, and determines the tensile rigidity and the change in weight for the tensile rigidity evaluation model that is obtained by connecting the obtained optimally shaped stiffening member model to the door outer panel model. Moreover, Embodiment 3 evaluates the tensile rigidity of the tensile rigidity evaluation model when the elastic modulus of the obtained optimally shaped stiffening member model is changed, and examines a preferable range of the elastic modulus of resin used for the stiffening member.

In Embodiment 3, the elastic modulus and density of aluminum used as a material for the door outer panel model 23 was set to 70 GPa and 2.7 g/cm$^3$. Moreover, the sheet thickness of the door outer panel model 23 was set to 0.8 mm or 0.6 mm, and similar to Embodiment 2, the optimally shaped stiffening member model was obtained by performing the topology optimization analysis on each door outer panel model 23 with different sheet thickness.

In the topology optimization analysis, the values indicated in Table 1 described above were set as the material properties of the stiffening member model 27 excluding the elastic modulus. Moreover, the load and constraint conditions are set the same as those in Embodiment 2 (see FIG. 10), and similar to Embodiment 1, the objective function was set to the minimum volume, and the constraint condition was set to a displacement of 1.5 mm or less at the loading point, as the optimization analysis conditions.

Figure 15:
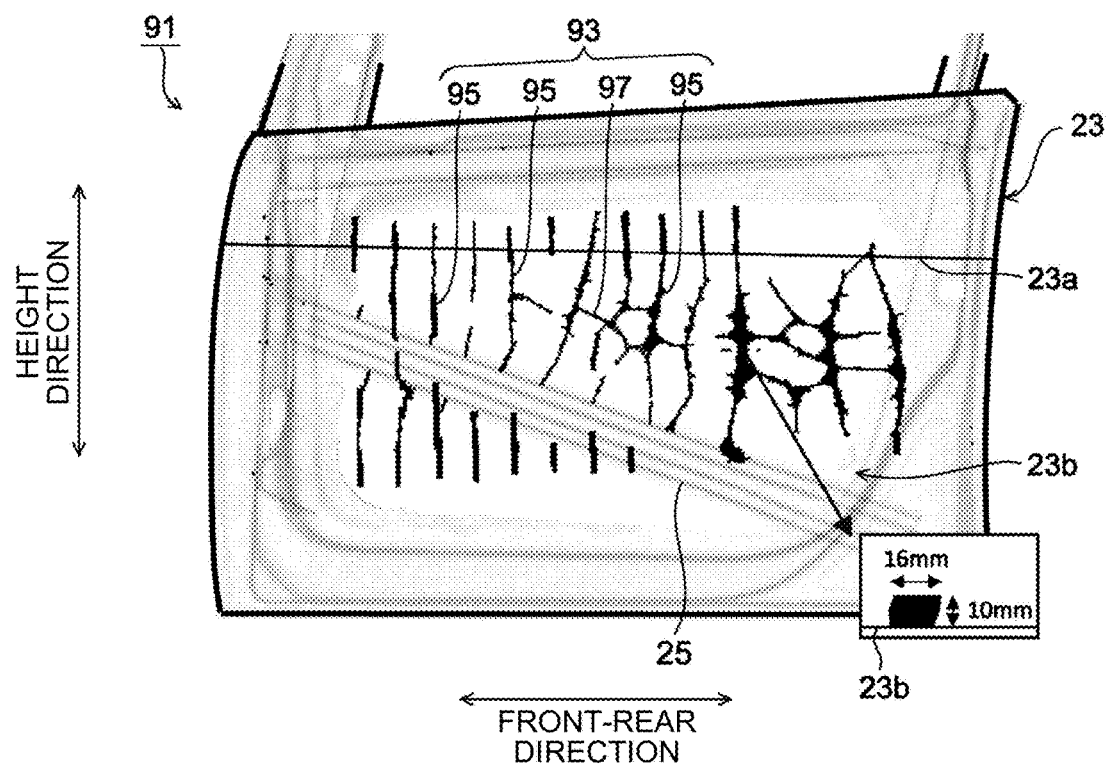
FIG. 15 is a diagram illustrating a stiffening member model having an optimal shape obtained through the topology optimization analysis, in Embodiment 3 (door outer panel made of an aluminum sheet, sheet thickness 0.8 mm).

FIG. 15 illustrates an optimally shaped stiffening member model 93 obtained by the optimization analysis when the sheet thickness of the door outer panel model 23 made of an aluminum sheet is 0.8 mm. Even when the material of the door outer panel model 23 is aluminum, similar to the optimally shaped stiffening member model 31 (FIG. 5) obtained by setting the material of the door outer panel model 23 to steel, the optimally shaped stiffening member model 93 has a bone structure including a vertical bone portion 95 that extend in a streak shape from the impact beam model 25 in the height direction, and a horizontal bone portion 97 that extends in the direction intersecting with the vertical bone portion 95.

Figure 16:
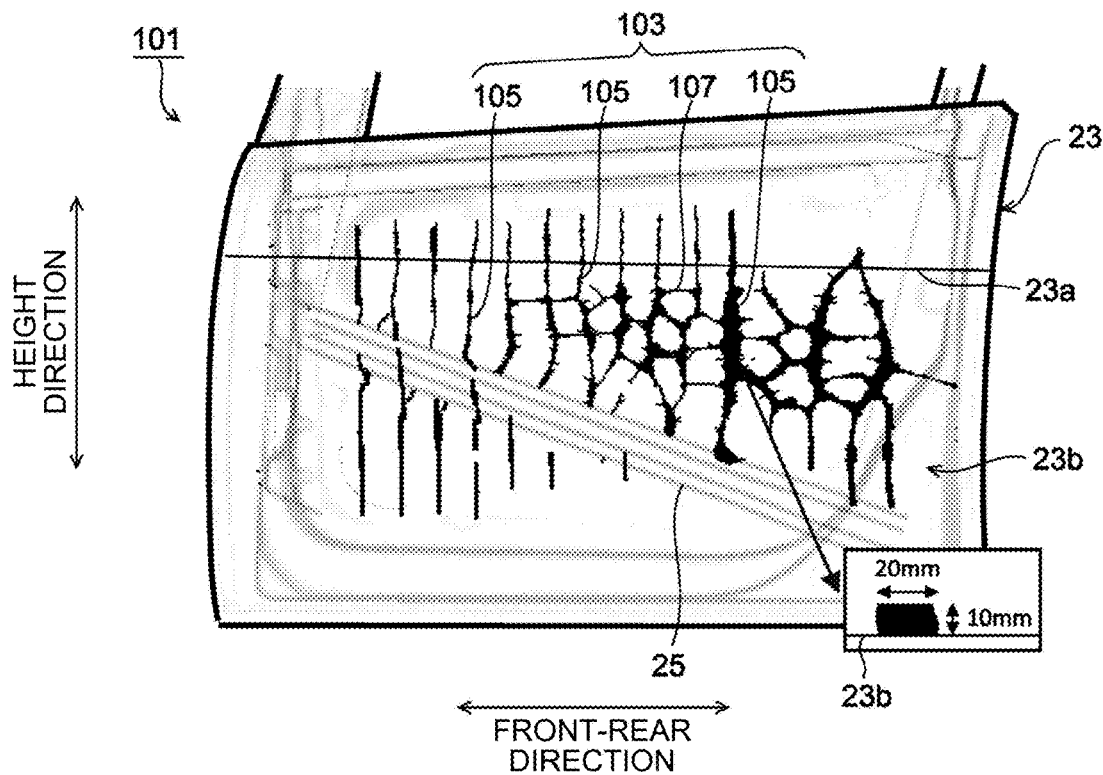
FIG. 16 is a diagram illustrating a stiffening member model having an optimal shape obtained through the topology optimization analysis, in Embodiment 3 (door outer panel made of an aluminum sheet, sheet thickness 0.6 mm).

FIG. 16 illustrates an optimally shaped stiffening member model 103 obtained by the optimization analysis when the sheet thickness of the door outer panel model 23 made of an aluminum sheet is 0.6 mm. Similar to the optimally shaped stiffening member model 93 in the door outer panel model 23 with a sheet thickness of 0.8 mm, the optimally shaped stiffening member model 103 has a bone structure including a vertical bone portion 105 that extends in a streak shape from the impact beam model 25 in the height direction, and a horizontal bone portion 107 that extends in the direction intersecting with the vertical bone portion 105.

Next, the tensile rigidity and reduction in weight were evaluated for a tensile rigidity evaluation model 91 (FIG. 15) obtained by connecting the optimally shaped stiffening member model 93 to the door outer panel model 23 made of an aluminum sheet the sheet thickness of which is 0.8 mm. The tensile rigidity and reduction in weight were also evaluated for a tensile rigidity evaluation model 101 (FIG.

16) obtained by connecting an optimally shaped stiffening member model 103 to the door outer panel model 23 made of an aluminum sheet the sheet thickness of which is 0.6 mm.

Similar to Embodiment 2, the tensile rigidity of the tensile rigidity evaluation models 91 and 101 was evaluated by the tensile rigidity value calculated using the displacement at the evaluation points (evaluation point A to evaluation point D) illustrated in FIG. 12 and the applied load when load is applied to the evaluation points. In Embodiment 3 also, from the constraint condition of displacement in the topology optimization analysis, the reference value of tensile rigidity was set to 80 N/mm, and the tensile rigidity value equal to or more than the reference value was considered as an excellent tensile rigidity value.

Moreover, reduction in weight was evaluated by the change in weight when the optimally shaped stiffening member model 93 or 103 was connected to the door outer panel model 23 the sheet thickness of which was reduced from 1.1 mm to 0.8 mm or 0.6 mm. Table 4 indicates the results of the tensile rigidity values and the change in weight of the tensile rigidity evaluation models 91 and 101.

have favorable results as the values have exceeded the reference value (=80 N/mm) at all evaluation points (evaluation point A to evaluation point D). Moreover, the change in weight was −325 grams or −567 grams, and the weight was reduced than that of Conventional Example.

Embodiment 4

To evaluate the tensile rigidity of the door panel part when the combination of materials of the door outer panel and the door inner panel is different, for a door panel part including a door outer panel and a door inner panel, Embodiment 4 determines the tensile rigidity and the change in weight of the tensile rigidity evaluation model obtained by connecting the optimally shaped stiffening member model to the door panel part model including the door outer panel model and the door inner panel model.

In Embodiment 4, the optimally shaped stiffening member model connected to the door panel part model is the optimally shaped stiffening member model 51 (FIG. 11) obtained for the door outer panel model 23 the material of which is steel, or the optimally shaped stiffening member

TABLE 4

| No | Sheet Thickness of Aluminum Sheet (mm) | Shape of Stiffening Member | Elastic Modulus (GPa) | Tensile Rigidity Value (N/mm) | | | | Weight of Stiffening Member (g) | Change in Weight (g) |
|---|---|---|---|---|---|---|---|---|---|
| | | | | Evaluation Point A | Evaluation Point B | Evaluation Point C | Evaluation Point D | | |
| Conventional Example 2 | 1.1 | Without Stiffening Member | — | 48 | 48 | 31 | 101 | 0 | 0 |
| Example 6 | 0.8 | FIG. 15 | 30 | 121 | 132 | 122 | 132 | 255 | −325 |
| Example 7 | 0.8 | FIG. 15 | 11 | 85 | 97 | 80 | 117 | 255 | −325 |
| Example 8 | 0.8 | FIG. 15 | 50 | 144 | 151 | 148 | 139 | 255 | −325 |
| Example 9 | 0.8 | FIG. 15 | 100 | 179 | 177 | 186 | 146 | 255 | −325 |
| Example 10 | 0.6 | FIG. 16 | 30 | 147 | 163 | 166 | 115 | 400 | −567 |
| Example 11 | 0.6 | FIG. 16 | 15 | 116 | 135 | 128 | 101 | 400 | −567 |
| Example 12 | 0.6 | FIG. 16 | 50 | 172 | 184 | 194 | 125 | 400 | −567 |
| Example 13 | 0.6 | FIG. 16 | 100 | 206 | 212 | 232 | 137 | 400 | −567 |

In Table 4, Conventional Example 2 is the results obtained when the door outer panel model 23 made of an aluminum sheet to which either of the optimally shaped stiffening member model 93 or 103 is not connected and the sheet thickness of which is kept to 1.1 mm was used as the tensile rigidity evaluation model. Example 6 is the results of the tensile rigidity evaluation model 91 obtained by connecting the optimally shaped stiffening member model 93 illustrated in FIG. 15 to the door outer panel model 23 with a sheet thickness of 0.8 mm. Moreover, Example 7, Example 8, and Example 9 are the results obtained when the elastic modulus of the optimally shaped stiffening member model 93 was changed to the values indicated in Table 4, similar to Example 6.

Moreover, Example 10 is the results of the tensile rigidity evaluation model 101 obtained by connecting the optimally shaped stiffening member model 103 illustrated in FIG. 16 to the door outer panel model 23 with a sheet thickness of 0.6 mm. Moreover, Example 11, Example 12, and Example 13 are the results obtained when the elastic modulus of the optimally shaped stiffening member model 103 was changed to the values indicated in Table 4.

As indicated in Table 4, in Example 6 to Example 13, the elastic modulus of the optimally shaped stiffening member model 103 is 10 GPa or more, and the tensile rigidity values model 93 (FIG. 15) obtained for the door outer panel model 23 the material of which is aluminum.

Table 5 indicates the material and sheet thickness of the door outer panel model and the door inner panel model of the tensile rigidity evaluation model, and the combinations of the optimally shaped stiffening member model. In Table 5, an inner panel indicates the door inner panel model, and an outer panel indicates the door outer panel model. Aluminum (Al), steel (Fe), or resin was used for the material of the inner panel and the outer panel, and the values indicated in Table 1 were set as the material properties of resin.

Similar to Embodiment 2, the tensile rigidity values of the tensile rigidity evaluation model were evaluated by the tensile rigidity values calculated using displacement at the evaluation points (evaluation point A to evaluation point D) illustrated in FIG. 12 and the applied load when load is applied to the evaluation points. Moreover, the reduction in weight was evaluated by the change in weight obtained when the optimally shaped stiffening member model 93 or 103 was connected to the door outer panel model 23 the sheet thickness of which was reduced from 1.1 mm to 0.8 mm or 0.6 mm. Table 5 indicates the results of the tensile rigidity values and the change in weight of the tensile rigidity evaluation model.

TABLE 5

| No | Inner Panel Material | Inner Panel Sheet Thickness (mm) | Outer Panel Material | Outer Panel Sheet Thickness (mm) | Shape of Stiffening Member | Elastic Modulus (GPa) | Tensile Rigidity Value (N/mm) Evaluation Point A | Evaluation Point B | Evaluation Point C | Evaluation Point D | Weight of Stiffening Member (g) | Change in Weight (g) |
|---|---|---|---|---|---|---|---|---|---|---|---|---|
| Conventional Example 3 | Al | 1.1 | Fe | 0.6 | Without Stiffening Member | — | 39 | 42 | 27 | 84 | 0 | 0 |
| Example 14 | Al | 1.1 | Fe | 0.5 | FIG. 11 | 30 | 101 | 112 | 108 | 94 | 106 | −456 |
| Conventional Example 4 | Resin | 1.5 | Fe | 0.6 | Without Stiffening Member | — | 39 | 42 | 27 | 84 | 0 | 0 |
| Example 15 | Resin | 1.5 | Fe | 0.5 | FIG. 11 | 30 | 101 | 112 | 107 | 94 | 106 | −456 |
| Conventional Example 5 | Fe | 0.65 | Al | 1.1 | Without Stiffening Member | — | 47 | 48 | 31 | 99 | 0 | 0 |
| Example 16 | Fe | 0.65 | Al | 0.8 | FIG. 15 | 30 | 119 | 129 | 119 | 130 | 255 | −325 |
| Conventional Example 6 | Resin | 1.5 | Al | 1.1 | Without Stiffening Member | — | 47 | 48 | 31 | 100 | 0 | 0 |
| Example 17 | Resin | 1.5 | Al | 0.8 | FIG. 15 | 30 | 121 | 131 | 121 | 132 | 255 | −325 |
| Conventional Example 7 | Fe | 0.65 | Resin | 1.5 | Without Stiffening Member | — | 43 | 41 | 27 | 89 | 0 | 0 |
| Example 18 | Fe | 0.65 | Resin | 1.1 | FIG. 15 | 30 | 108 | 109 | 107 | 111 | 255 | −174 |
| Conventional Example 8 | Al | 1.1 | Resin | 1.5 | Without Stiffening Member | — | 44 | 41 | 27 | 90 | 0 | 0 |
| Example 19 | Al | 1.1 | Resin | 1.1 | FIG. 15 | 30 | 110 | 111 | 109 | 113 | 255 | −174 |
| Conventional Example 9 | Resin | 1.5 | Resin | 1.5 | Without Stiffening Member | — | 44 | 41 | 27 | 90 | 0 | 0 |
| Example 20 | Resin | 1.5 | Resin | 1.1 | FIG. 15 | 30 | 109 | 110 | 108 | 112 | 255 | −174 |

In Table 5, Conventional Example 3 to Conventional Example 9 are the results obtained when the door panel part model to which the optimally shaped stiffening member model is not connected and in which the combination of materials of the door inner panel model and the door outer panel model is changed was used as the tensile rigidity evaluation model. Moreover, Example 14 and Example 15 were obtained by changing the material of the door inner panel and the sheet thickness of the door outer panel model and the door inner panel model, in the tensile rigidity evaluation model obtained by connecting the optimally shaped stiffening member model 51, when the door outer panel illustrated in FIG. 11 is steel (Fe). Moreover, Example 16 to Example 20 were obtained by changing the combination of materials and the sheet thickness of the door outer panel model and the door inner panel, in the tensile rigidity evaluation model obtained by connecting the optimally shaped stiffening member model 93, when the door outer panel illustrated in FIG. 15 is aluminum (Al). The optimally shaped stiffening member model 93 illustrated in FIG. 15 was also applied, when the door outer panel is resin.

As indicated in Table 5, in Example 14 to Example 20, the tensile rigidity values have favorable results as the values have exceeded the reference value (=80 N/mm) at all evaluation points (evaluation point A to evaluation point D). Moreover, the tensile rigidity values in Example 14 and Example 15 were increased and the weight was reduced by 456 grams than those in Conventional Example 3 and Conventional Example 4. Furthermore, in Example 16 and Example 17 also, the tensile rigidity values were increased and the weight was reduced by 325 grams than those in Conventional Example 5 and Conventional Example 6. Still furthermore, in Example 18 to Example 20, the tensile rigidity values were increased and the weight was reduced by 174 grams than those in Conventional Example 7 to Conventional Example 9.

Embodiment 5

Embodiment 5 obtains the tensile rigidity and the change in weight of the tensile rigidity evaluation model obtained by connecting the stiffening member model in which the vertical bone portion and the horizontal bone portion are arranged regularly, to the door panel part model including the door outer panel model and the door inner panel model.

In Embodiment 5, the tensile rigidity evaluation model was generated by connecting a stiffening member model having the same shape as that of the stiffening member 73 in the honeycomb shape illustrated in FIG. 13, or a stiffening member model having the same shape as that of the stiffening member 83 in the lattice shape illustrated in FIG. 14, to the door outer panel model.

Steel is used as a material for the door outer panel model and the door inner panel model in the tensile rigidity evaluation model. Table 6 indicates the sheet thickness of the door outer panel model made of a steel sheet and the combination of the stiffening member model. Resin is used as a material for the stiffening member model, and the values indicated in Table 1 were set as the material properties of resin.

Similar to Embodiment 2, the tensile rigidity values of the tensile rigidity evaluation model were evaluated by the tensile rigidity value calculated using the displacement at the evaluation points (evaluation point A to evaluation point D) illustrated in FIG. 12 when load is applied to the evaluation points, and the applied load. Moreover, reduction in weight was evaluated by the change in weight when a stiffening member model having the same shape as that of the stiffening member 73 or a stiffening member model having the same shape as that of the stiffening member 83 was connected to the door outer panel model 23 the sheet thickness of which was reduced from 0.6 mm to 0.5 mm. Table 6 indicates the results of the tensile rigidity values and the change in weight of the tensile rigidity evaluation model.

TABLE 6

| No | Sheet Thickness of Outer Panel (mm) | Shape of Stiffening Member | Elastic Modulus (GPa) | Tensile Rigidity Value (N/mm) | | | | Weight of Stiffening Member (g) | Change in Weight (g) |
|---|---|---|---|---|---|---|---|---|---|
| | | | | Evaluation Point A | Evaluation Point B | Evaluation Point C | Evaluation Point D | | |
| Conventional Example 10 | 0.6 | Without Stiffening Member | — | 39 | 41 | 27 | 83 | 0 | 0 |
| Example 21 | 0.5 | FIG. 13 | 30 | 169 | 130 | 116 | 150 | 294 | −268 |
| Example 22 | 0.5 | FIG. 14 | 30 | 216 | 158 | 138 | 131 | 384 | −178 |

In Table 6, Conventional Example 10 is the results obtained when the door panel part model to which the stiffening member model is not connected was used as the tensile rigidity evaluation model. Moreover, Example 21 is the results of the tensile rigidity evaluation model obtained by connecting a stiffening member model having the same shape as that of the stiffening member 73 illustrated in FIG. 13 to the door outer panel model. Example 22 is the results of the tensile rigidity evaluation model obtained by connecting a stiffening member model having the same shape as that of the stiffening member 83 illustrated in FIG. 14 to the door outer panel model.

As indicated in Table 6, the tensile rigidity values in Example 21 and Example 22 have favorable results as the values have exceeded the reference value (=80 N/mm) at all evaluation points (evaluation point A to evaluation point D). Consequently, the tensile rigidity values have increased than those in Conventional Example 10. Moreover, the weight was reduced by 268 grams in Example 21, and reduced by 178 grams in Example 22.

INDUSTRIAL APPLICABILITY

With the present invention, it is possible to provide the stiffening structure and the stiffening method for an automotive door panel part that can reduce the weight of a door panel part, while improving the tensile rigidity of the door panel part of an automobile.

REFERENCE SIGNS LIST 1 stiffening structure
3 door outer panel
3a character line
3b panel surface part
5 impact beam
5a rear end
7 stiffening member
9 vertical bone portion
11 horizontal bone portion
13 vertical bone portion
21 optimization analysis model
23 door outer panel model
23a character line
23b panel surface part
25 impact beam model
27 stiffening member model
29 design space
31 optimally shaped stiffening member model
33 vertical bone portion
35 horizontal bone portion
37 vertical bone portion
41 tensile rigidity evaluation model (Example 1)
43 tensile rigidity evaluation model (Comparison Example 1)
45 stiffening member model (Comparison Example 1)
47 tensile rigidity evaluation model (Comparison Example 2)
49 stiffening member model (Comparison Example 2)
51 optimally shaped stiffening member model
53 vertical bone portion
55 horizontal bone portion
57 vertical bone portion
61 tensile rigidity evaluation model
71 stiffening structure
73 stiffening member (honeycomb shape)
75 vertical bone portion
77 horizontal bone portion
81 stiffening structure
83 stiffening member (lattice shape)
85 vertical bone portion
87 horizontal bone portion
91 tensile rigidity evaluation model
93 optimally shaped stiffening member model
95 vertical bone portion
97 horizontal bone portion
101 tensile rigidity evaluation model
103 optimally shaped stiffening member model
105 vertical bone portion
107 horizontal bone portion

The invention claimed is:
1. A stiffening structure of an automotive door panel part comprising:
a door panel part made of a metal sheet, the door panel part being configured to curve along a height direction;
a character line formed on the door panel part;
an impact beam provided at a side of an inner surface of the door panel part; and
a stiffening member made of resin, the stiffening member being configured to attach to the inner surface of the door panel part, wherein
the stiffening member includes vertical bone portions configured to extend from the impact beam to the character line along the curve of the door panel part, one end of the vertical bone portion being placed at the impact beam and formed so as to fill a gap between the door part and the impact beam, and the other end of the vertical bone portion being placed at the character line, and the vertical bone portions are provided at a predetermined interval in a front-rear direction of the door panel part, and are bonded to the inner surface of the door panel part.

2. The stiffening structure of the automotive door panel part according to claim 1, wherein the stiffening member further includes a horizontal bone portion configured to extend in a direction intersecting with the vertical bone portions.

3. The stiffening structure of the automotive door panel part according to claim 1, wherein the stiffening member is a fiber-reinforced plastic having elastic modulus of 10 GPa or more.

4. The stiffening structure of the automotive door panel part according to claim 2, wherein the stiffening member is a fiber-reinforced plastic having elastic modulus of 10 GPa or more.

5. A stiffening structure of an automotive door panel part comprising:
    a door panel part configured to curve along a height direction, the door panel part including:
        a door outer panel; and
        a door inner panel, where a material of the door outer panel and the door inner panel is a combination of one of metal and metal, resin and resin, metal and resin, and resin and metal;
    a character line formed on the door panel part;
    an impact beam provided at a side of an inner surface of the door panel part; and
    a stiffening member made of resin, the stiffening member being configured to attach to the inner surface of the door panel part, wherein
    the stiffening member includes vertical bone portions configured to extend from the impact beam to the character line along the curve of the door panel part, one end of the vertical bone portion being placed at the impact beam and formed so as to fill a gap between the inner surface of the door part and the impact beam, and the other end of the vertical bone portion being placed at the character line, and
    the vertical bone portions are provided at a predetermined interval in a front-rear direction of the door panel part, and are bonded to the inner surface of the door panel part.

6. The stiffening structure of the automotive door panel part according to claim 5, wherein the stiffening member further includes a horizontal bone portion configured to extend in a direction intersecting with the vertical bone portions.

7. The stiffening structure of the automotive door panel part according to claim 5, wherein the stiffening member is a fiber-reinforced plastic having elastic modulus of 10 GPa or more.

8. The stiffening structure of the automotive door panel part according to claim 6, wherein the stiffening member is a fiber-reinforced plastic having elastic modulus of 10 GPa or more.

9. A method of stiffening an automotive door panel part made of a metal sheet, the method improving tensile rigidity of the automotive door panel part, and comprising:
    acquiring a door panel part model by modelling a door panel part using a two-dimensional element and/or a three-dimensional element;
    connecting a stiffening member model being a target of optimization analysis to the door panel part model;
    performing optimization analysis for obtaining an optimal shape of the stiffening member model;
    manufacturing a stiffening member that bonds to the inner surface of the door panel part, based on the optimal shape of the stiffening member model; and
    bonding the manufactured stiffening member to the inner surface of the door panel part, wherein
    the manufactured stiffening member includes vertical bone portions that extend from an impact beam provided on a side of the inner surface of the door panel part to a character line formed on the door panel part, along the curve of the door panel part in the height direction, one end of the vertical bone portion being placed at the impact beam and formed so as to fill a gap between the inner surface of the door part and the impact beam, and the other end of the vertical bone portion being placed at the character line, and
    the vertical bone portions are provided at a predetermined interval in a front-rear direction of the door panel part.

10. The method of stiffening the automotive door panel part according to claim 9, wherein the manufactured stiffening member further includes a horizontal bone portion that extends in a direction intersecting with the vertical bone portions.

11. A method of stiffening an automotive door panel part that improves tensile rigidity of the automotive door panel part, the door panel part including a door outer panel and a door inner panel, where a material of the door outer panel and the door inner panel is a combination of one of metal and metal, resin and resin, metal and resin, and resin and metal, the method comprising:
    acquiring a door panel part model by modelling a door panel part using a two-dimensional element and/or a three-dimensional element;
    connecting a stiffening member model being a target of optimization analysis to the door panel part model;
    performing optimization analysis for obtaining an optimal shape of the stiffening member model;
    manufacturing a stiffening member that bonds to the inner surface of the door panel part, based on the optimal shape of the stiffening member model; and
    bonding the manufactured stiffening member to the inner surface of the door panel part, wherein
    the manufactured stiffening member includes vertical bone portions that extend from an impact beam provided on a side of the inner surface of the door panel part to a character line formed on the door panel part, along the curve of the door panel part in the height direction, one end of the vertical bone portion being placed at the impact beam and formed so as to fill a gap between the inner surface of the door part and the impact beam, and the other end of the vertical bone portion being placed at the character line, and
    the vertical bone portions are provided at a predetermined interval in a front-rear direction of the door panel part.

12. The method of stiffening the automotive door panel part according to claim 11, wherein the manufactured stiffening member further includes a horizontal bone portion that extends in a direction intersecting with the vertical bone portions.

* * * * *